(12) United States Patent
Zhang et al.

(10) Patent No.: US 9,820,214 B2
(45) Date of Patent: Nov. 14, 2017

(54) ACCESS CONTROL METHOD, BASE STATION, USER EQUIPMENT, AND MOBILITY MANAGEMENT ENTITY

(71) Applicant: HUAWEI TECHNOLOGIES CO., LTD., Shenzhen (CN)

(72) Inventors: Hongzhuo Zhang, Shanghai (CN); Yang Zhao, Shanghai (CN); Dong Chen, Shanghai (CN); Philippe Reininger, Issy Les Moulineaux (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 14/735,839

(22) Filed: Jun. 10, 2015

(65) Prior Publication Data

US 2015/0282048 A1    Oct. 1, 2015

Related U.S. Application Data

(63) Continuation of application No. PCT/CN2012/086353, filed on Dec. 11, 2012.

(51) Int. Cl.
*H04W 48/04* (2009.01)
*H04W 8/14* (2009.01)
(Continued)

(52) U.S. Cl.
CPC ........... *H04W 48/04* (2013.01); *H04W 28/08* (2013.01); *H04W 48/18* (2013.01); *H04W 8/12* (2013.01);
(Continued)

(58) Field of Classification Search
CPC ..... H04W 28/08; H04W 36/12; H04W 48/04; H04W 48/042; H04W 48/18;
(Continued)

(56) References Cited

U.S. PATENT DOCUMENTS

2010/0120399 A1*  5/2010  Guo .................. H04L 29/12207
                                                      455/411
2012/0270589 A1   10/2012  Guo et al.
2012/0302196 A1   11/2012  Chin et al.

FOREIGN PATENT DOCUMENTS

CN          101272618          9/2008
CN          101355793          1/2009
(Continued)

OTHER PUBLICATIONS

Extended European Search Report dated Nov. 13, 2015 in corresponding European Patent Application No. 12890008.1.
(Continued)

*Primary Examiner* — Erica Navar
(74) *Attorney, Agent, or Firm* — Staas & Halsey LLP

(57) ABSTRACT

The present invention provides an access control method, a base station, user equipment, and a mobility management entity, where the access control method includes: receiving, by the base station, a temporary identifier and a PLMN available indication that are of the UE and sent by the UE; receiving a service request message sent by the UE, and determining a serving MME of the UE according to a GMMEI in the temporary identifier of the UE; and sending the service request message and the PLMN available indication to the serving MME of the UE, so that the serving MME of the UE sends a redirection indication, and the UE registers with an HPLMN of the UE. Therefore, in a network sharing scenario, the UE can select the home PLMN of the UE as a serving PLMN of the UE as early as possible.

17 Claims, 10 Drawing Sheets

An MME receives a service request message and a PLMN available indication that are sent by a base station — 201

The MME sends a redirection indication, so that a UE registers with a target PLMN of redirection — 202

(51) Int. Cl.
*H04W 48/18* (2009.01)
*H04W 28/08* (2009.01)
*H04W 36/12* (2009.01)
*H04W 84/04* (2009.01)
*H04W 88/00* (2009.01)
*H04W 88/08* (2009.01)
*H04W 8/12* (2009.01)
*H04W 8/26* (2009.01)

(52) U.S. Cl.
CPC ............... *H04W 8/14* (2013.01); *H04W 8/26* (2013.01); *H04W 36/12* (2013.01); *H04W 84/042* (2013.01); *H04W 88/005* (2013.01); *H04W 88/08* (2013.01)

(58) Field of Classification Search
CPC ..... H04W 88/005; H04W 88/08; H04W 8/12; H04W 8/14; H04W 8/26
USPC .............................................. 455/432.1–433
See application file for complete search history.

(56) References Cited

FOREIGN PATENT DOCUMENTS

| | | |
|---|---|---|
| CN | 102026328 | 4/2011 |
| CN | 102170626 | 8/2011 |
| CN | 102696260 | 9/2012 |
| EP | 2 161 963 A1 | 3/2010 |
| EP | 2 421 305 A1 | 2/2012 |
| WO | 2008/014684 A1 | 2/2008 |

OTHER PUBLICATIONS

PCT International Search Report dated Sep. 19, 2013 in corresponding International Patent Application No. PCT/CN2012/086353.
"3$^{rd}$ Generation Partnership Project; Technical Specification Group Core Network and Terminals; Non-Access-Stratum (NAS) functions related to Mobile Station (MS) in idle mode (Release 11)", 3GPP TS 23.122, V11.3.0, Sep. 2012, pp. 1-44.
International Search Report mailed Sep. 19, 2013 in corresponding international application PCT/CN2012/086353.
Chinese Office Action dated Sep. 18, 2017 from Chinese Patent Application No. 201280067660.0, 12 pages.

* cited by examiner

ACCESS CONTROL METHOD, BASE STATION, USER EQUIPMENT, AND MOBILITY MANAGEMENT ENTITY

CROSS-REFERENCE TO RELATED APPLICATIONS

This application is a continuation of International Application No. PCT/CN2012/086353, filed on Dec. 11, 2012, which is hereby incorporated by reference in its entirety.

TECHNICAL FIELD

The present invention relates to the field of communications technologies, and in particular, to an access control method, a base station, user equipment, and a mobility management entity.

BACKGROUND

Construction of a mobile network requires a huge amount of funds, which brings heavy financial pressure to an operator. A network sharing technology can enable multiple operators to provide services for their respective subscribers by using a shared mobile network, significantly reducing costs for repeated construction of mobile networks. Currently, there are mainly four network sharing manners: (1) sharing a site; (2) sharing an access network; (3) sharing both an access network and a core network; (4) sharing a geographical area network.

A Long Term Evolution (Long Term Evolution, LTE for short) mobile communications system is used as an example. User equipment (User Equipment, UE for short) in an idle state initiates a service request procedure before sending uplink data. During an UE access process, the UE selects a previously registered mobility management entity (Mobility Management Entity, MME for short) as its serving MME. Therefore, an operator serving the UE does not change in a service access procedure. However, in a network sharing scenario, when moving from a network of operator A to a shared network on which both operator A and operator B can provide a service, a subscriber of operator B cannot select, in a timely manner, the home operator B of the subscriber as a serving operator of the subscriber.

In addition, in a network scenario in which an access network is shared, or in a network scenario in which both an access network and a core network are shared, an LTE mobile communications system is still used as an example. A base station (evolved NodeB, eNB for short) broadcasts, in a broadcast message, a list of operators supported by the evolved NodeB, that is, a public land mobile network (Public Land Mobile Network, PLMN for short) list. A UE reads the operator list (PLMN list) in the broadcast message, selects one PLMN from the operator list, and sends the selected PLMN to the eNB in a Radio Resource Control (Radio Resource Control, RRC for short) connection setup procedure, and the eNB selects a core network node of this operator for the UE according to the selected PLMN, to provide a service for the UE. However, when a core network node of an operator is overloaded, subsequent access of a subscriber of this operator cannot be controlled in the prior art. Moreover, in an enhanced network sharing scenario, when a quantity of access subscribers of an operator reaches an upper limit of a rented share, subsequent access of a subscriber of this operator cannot be controlled in the prior art. In addition, when a roaming subscriber accesses a shared network, load sharing cannot be performed among multiple operators. As a result, an operator ranking first in a broadcast list tends to be overloaded, or achieves an excessive income from roaming subscribers.

SUMMARY

The present invention provides an access control method, a base station, user equipment, and a mobility management entity, so that in a network sharing scenario, the user equipment can register with a home operator of the user equipment as early as possible.

A first aspect of the present invention provides an access control method, including:
  receiving, by a base station, a temporary identifier and a public land mobile network PLMN available indication that are of user equipment and sent by the user equipment;
  receiving, by the base station, a service request message sent by the user equipment, and determining a serving mobility management entity of the user equipment according to a global mobility management entity identifier in the temporary identifier of the user equipment; and
  sending, by the base station, the service request message and the PLMN available indication to the serving mobility management entity of the user equipment.

A second aspect of the present invention provides an access control method, including:
  receiving, by a mobility management entity, a service request message and a public land mobile network PLMN available indication that are sent by a base station, where the mobility management entity is a serving mobility management entity of user equipment, and the service request message and the PLMN available indication are sent to the mobility management entity after the base station receives a temporary identifier and the PLMN available indication that are of the user equipment and sent by the user equipment, receives the service request message sent by the user equipment, and determines the serving mobility management entity of the user equipment according to a global mobility management entity identifier in the temporary identifier of the user equipment; and
  sending, by the mobility management entity, a redirection indication, so that the user equipment registers with a target PLMN of redirection.

A third aspect of the present invention provides an access control method, including:
  sending, by user equipment, a temporary identifier and a public land mobile network PLMN available indication that are of the user equipment to a base station; and
  sending, by the user equipment, a service request message to the base station, so that after receiving the service request message sent by the user equipment, the base station determines a serving mobility management entity of the user equipment according to a global mobility management entity identifier in the temporary identifier of the user equipment, and sends the service request message and the PLMN available indication to the serving mobility management entity of the user equipment.

A fourth aspect of the present invention provides an access control method, including:
  reading, by user equipment, an operator list broadcast by a cell; and
  if the operator list does not include a public land mobile network PLMN with which the user equipment successfully registers most recently, a home PLMN of the user equipment, a user controlled PLMN, or an operator controlled PLMN, randomly selecting, by the user equipment when the operator list includes at least two visited PLMNs, one PLMN from the at least two visited PLMNs for access.

A fifth aspect of the present invention provides an access control method, including:

reading, by user equipment, an operator list and an operator barring indication that are broadcast by a cell, where the operator barring indication is used to indicate an identifier of a PLMN that is barred for access; and if the operator list does not include a public land mobile network PLMN with which the user equipment successfully registers most recently, a home PLMN of the user equipment, a user controlled PLMN, or an operator controlled PLMN, selecting, by the user equipment when the operator list includes at least two visited PLMNs, one PLMN except the PLMN indicated by the operator barring indication from the at least two visited PLMNs for access.

A sixth aspect of the present invention provides an access control method, including:

reading, by user equipment, an operator list and a preferred operator indication that are broadcast by a cell, where the preferred operator indication is used to indicate an identifier of a public land mobile network PLMN that is preferably accessed by a roaming subscriber; and if the operator list does not include a PLMN with which the user equipment successfully registers most recently, a home PLMN of the user equipment, a user controlled PLMN, or an operator controlled PLMN, selecting, by the user equipment, the PLMN indicated by the preferred operator indication from the operator list for access.

A seventh aspect of the present invention provides an access control method, including:

obtaining, by a base station, an operator list and an operator barring indication, where the operator barring indication is used to indicate an identifier of a PLMN that is barred for access; and broadcasting, by the base station, the operator list and the operator barring indication, so that after the user equipment reads the operator list and the operator barring indication, and when the operator list does not include a public land mobile network PLMN with which the user equipment successfully registers most recently, a home PLMN of the user equipment, a user controlled PLMN, or an operator controlled PLMN, the user equipment selects, when the operator list includes at least two visited PLMNs, one PLMN except the PLMN indicated by the operator barring indication from the at least two visited PLMNs for access.

An eighth aspect of the present invention provides an access control method, including:

obtaining, by a base station, an operator list and a preferred operator indication, where the preferred operator indication is used to indicate an identifier of a public land mobile network PLMN that is preferably accessed by a roaming subscriber; and broadcasting, by the base station, the operator list and the preferred operator indication, so that after the user equipment reads the operator list and the preferred operator indication, and when the operator list does not include a PLMN with which the user equipment successfully registers most recently, a home PLMN of the user equipment, a user controlled PLMN, or an operator controlled PLMN, the user equipment selects the PLMN indicated by the preferred operator indication from the operator list for access.

A ninth aspect of the present invention provides a base station, including:

a receiving module, configured to: receive a temporary identifier and a public land mobile network PLMN available indication that are of user equipment and sent by the user equipment; and receive a service request message sent by the user equipment;

a determining module, configured to determine a serving mobility management entity of the user equipment according to a global mobility management entity identifier in the temporary identifier of the user equipment received by the receiving module; and a sending module, configured to send the service request message received by the receiving module and the PLMN available indication received by the receiving module to the serving mobility management entity of the user equipment determined by the determining module.

A tenth aspect of the present invention provides a mobility management entity, including:

a receiving module, configured to receive a service request message and a public land mobile network PLMN available indication that are sent by a base station, where the mobility management entity is a serving mobility management entity of user equipment, and the service request message and the PLMN available indication are sent to the mobility management entity after the base station receives a temporary identifier and the PLMN available indication that are of the user equipment and sent by the user equipment, receives the service request message sent by the user equipment, and determines the serving mobility management entity of the user equipment according to a global mobility management entity identifier in the temporary identifier of the user equipment; and a sending module, configured to send a redirection indication, so that the user equipment registers with a target PLMN of redirection.

An eleventh aspect of the present invention provides user equipment, including:

a sending module, configured to: send a temporary identifier and a public land mobile network PLMN available indication that are of the user equipment to a base station; and send a service request message to the base station, so that after receiving the service request message sent by the user equipment, the base station determines a serving mobility management entity of the user equipment according to a global mobility management entity identifier in the temporary identifier of the user equipment, and sends the service request message and the PLMN available indication to the serving mobility management entity of the user equipment.

A twelfth aspect of the present invention provides user equipment, including:

a reading module, configured to read an operator list broadcast by a cell; and an accessing module, configured to: when the operator list read by the reading module does not include a public land mobile network PLMN with which the user equipment successfully registers most recently, a home PLMN of the user equipment, a user controlled PLMN, or an operator controlled PLMN, randomly select, if the operator list includes at least two visited PLMNs, one PLMN from the at least two visited PLMNs for access.

A thirteenth aspect of the present invention provides user equipment, including:

a reading module, configured to read an operator list and an operator barring indication that are broadcast by a cell, where the operator barring indication is used to indicate an identifier of a PLMN that is barred for access; and an accessing module, configured to: when the operator list read by the reading module does not include a public land mobile network PLMN with which the user equipment successfully registers most recently, a home PLMN of the user equipment, a user controlled PLMN, or an operator controlled PLMN, select, if the operator list includes at least two visited PLMNs, one PLMN except the PLMN indicated by the operator barring indication from the at least two visited PLMNs for access.

A fourteenth aspect of the present invention provides user equipment, including:

a reading module, configured to read an operator list and a preferred operator indication that are broadcast by a cell, where the preferred operator indication is used to indicate an identifier of a public land mobile network PLMN that is preferably accessed by a roaming subscriber; and an accessing module, configured to: when the operator list does not include a PLMN with which the user equipment successfully registers most recently, a home PLMN of the user equipment, a user controlled PLMN, or an operator controlled PLMN, select the PLMN indicated by the preferred operator indication from the operator list for access.

A fifteenth aspect of the present invention provides a base station, including:

an obtaining module, configured to obtain an operator list and an operator barring indication, where the operator barring indication is used to indicate an identifier of a PLMN that is barred for access; and a broadcasting module, configured to broadcast the operator list obtained by the obtaining module and the operator barring indication obtained by the obtaining module, so that after the user equipment reads the operator list and the operator barring indication, and when the operator list does not include a public land mobile network PLMN with which the user equipment successfully registers most recently, a home PLMN of the user equipment, a user controlled PLMN, or an operator controlled PLMN, the user equipment selects, when the operator list includes at least two visited PLMNs, one PLMN except the PLMN indicated by the operator barring indication from the at least two visited PLMNs for access.

A sixteenth aspect of the present invention provides a base station, including:

an obtaining module, configured to obtain an operator list and a preferred operator indication, where the preferred operator indication is used to indicate an identifier of a public land mobile network PLMN that is preferably accessed by a roaming subscriber; and a broadcasting module, configured to broadcast the operator list obtained by the obtaining module and the preferred operator indication obtained by the obtaining module, so that after the user equipment reads the operator list and the preferred operator indication, and when the operator list does not include a PLMN with which the user equipment successfully registers most recently, a home PLMN of the user equipment, a user controlled PLMN, or an operator controlled PLMN, the user equipment selects the PLMN indicated by the preferred operator indication from the operator list for access.

A seventeenth aspect of the present invention provides a base station, including a transmitter, a receiver, a memory, and a processor that is separately connected to the transmitter, the receiver, and the memory, where the memory stores a group of program code, and the processor is configured to invoke the program code stored in the memory to execute the method according to the first aspect of the present invention.

An eighteenth aspect of the present invention provides a mobility management entity, including a transmitter, a receiver, a memory, and a processor that is separately connected to the transmitter, the receiver, and the memory, where the memory stores a group of program code, and the processor is configured to invoke the program code stored in the memory to execute the method according to the second aspect of the present invention.

A nineteenth aspect of the present invention provides user equipment, including a transmitter, a receiver, a memory, and a processor that is separately connected to the transmitter, the receiver, and the memory, where the memory stores a group of program code, and the processor is configured to invoke the program code stored in the memory to execute the method according to the third aspect of the present invention.

A twentieth aspect of the present invention provides user equipment, including a transmitter, a receiver, a memory, and a processor that is separately connected to the transmitter, the receiver, and the memory, where the memory stores a group of program code, and the processor is configured to invoke the program code stored in the memory to execute the method according to the fourth aspect of the present invention.

A twenty-first aspect of the present invention provides user equipment, including a transmitter, a receiver, a memory, and a processor that is separately connected to the transmitter, the receiver, and the memory, where the memory stores a group of program code, and the processor is configured to invoke the program code stored in the memory to execute the method according to the fifth aspect of the present invention.

A twenty-second aspect of the present invention provides user equipment, including a transmitter, a receiver, a memory, and a processor that is separately connected to the transmitter, the receiver, and the memory, where the memory stores a group of program code, and the processor is configured to invoke the program code stored in the memory to execute the method according to the sixth aspect of the present invention.

A twenty-third aspect of the present invention provides a base station, including a transmitter, a receiver, a memory, and a processor that is separately connected to the transmitter, the receiver, and the memory, where the memory stores a group of program code, and the processor is configured to invoke the program code stored in the memory to execute the method according to the seventh aspect of the present invention.

A twenty-fourth aspect of the present invention provides a base station, including a transmitter, a receiver, a memory, and a processor that is separately connected to the transmitter, the receiver, and the memory, where the memory stores a group of program code, and the processor is configured to invoke the program code stored in the memory to execute the method according to the eighth aspect of the present invention.

A technical effect of the present invention is as follows: After a base station receives a temporary identifier and a PLMN available indication that are of user equipment and sent by the user equipment, and receives a service request message sent by the user equipment, the base station determines a serving mobility management entity of the user equipment according to a global mobility management entity identifier in the temporary identifier of the user equipment; then, the base station sends the service request message and the PLMN available indication to the serving mobility management entity of the user equipment, so that the serving mobility management entity of the user equipment sends a redirection indication, and the user equipment registers with a home PLMN of the user equipment. Therefore, in a network sharing scenario, the user equipment can select a home PLMN of the user equipment as a serving PLMN of the user equipment as early as possible.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
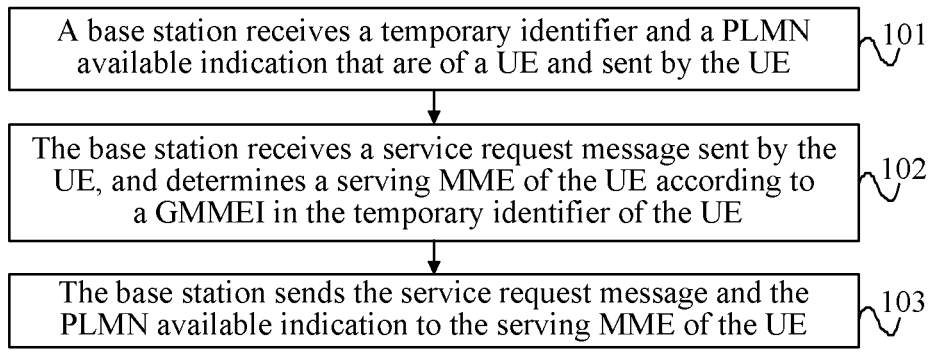
FIG. 1 is a flowchart of an embodiment of an access control method according to the present invention.

FIG. 1 is a flowchart of an embodiment of an access control method according to the present invention. As shown in FIG. 1, the access control method may include:

Step 101: A base station receives a temporary identifier and a PLMN available indication that are of a UE and sent by the UE.

In this embodiment, the temporary identifier of the UE may be a short temporary mobile subscriber identity (Short Temporary Mobile Subscriber Identity, S-TMSI for short).

Step 102: The base station receives a service request message sent by the UE, and determines a serving MME of the UE according to a global mobility management entity identifier (Global Mobility Management Entity Identifier, GMMEI for short) in the temporary identifier of the UE.

Step 103: The base station sends the service request message and the PLMN available indication to the serving MME of the UE.

Further, in an implementation manner of this embodiment, after step 103, the base station may further receive a redirection message sent by the serving MME of the UE, where the redirection message carries the service request message, a cause of redirection, and information about a target mobility management entity of redirection, and the redirection message is sent to the base station after the serving MME of the UE receives the PLMN available indication; then, the base station sends an initial user equipment message to the target MME of redirection according to the information about the target MME of redirection, where the initial user equipment message carries the service request message and a redirection attempt flag; next, the base station receives a redirection complete indication sent by the target MME of redirection.

The information about the target MME of redirection may be an identifier of the target MME of redirection or an address of the target MME of redirection.

In another implementation manner of this embodiment, after step 103, the base station may further receive a redirection message sent by the serving MME of the UE, where the redirection message carries the service request message, a cause of redirection, and an identifier of a target PLMN of redirection, and the redirection message is sent to the base station after the serving MME of the UE receives the PLMN available indication; then, the base station may determine, according to the identifier of the target PLMN of redirection, a target MME of redirection to which the target PLMN of redirection belongs, and send an initial user equipment message to the target MME of redirection, where the initial user equipment message carries the service request message and a redirection attempt flag; next, the base station receives a redirection complete indication sent by the target MME of redirection.

In the foregoing two implementation manners of this embodiment, the cause of redirection may be that the UE is redirected to an HPLMN of the UE, or the UE is redirected to an EHPLMN of the UE, or a registered PLMN of the UE changes, or an HPLMN of the UE is available, or an EHPLMN of the UE is available.

In the foregoing two implementation manners of this embodiment, after the base station receives the redirection complete indication sent by the target MME of redirection, the base station may further receive an initial context setup message sent by the target MME of redirection, where the initial context setup message is sent to the base station after the target MME of redirection sets up a bearer between a serving gateway (Serving Gateway, SGW for short) and a packet data gateway (Packet Data Network Gateway, PGW for short), and updates a location of the UE in a home subscriber server (Home Subscriber Server, HSS for short); next, the base station sends an initial user equipment context setup complete message to the target MME of redirection after setting up a radio bearer between the base station and the UE, so that the target MME of redirection sends a service response message to the UE after performing bearer modification, where the service response message carries the identifier of the target PLMN of redirection, so that the UE registers with the target PLMN of redirection.

In this embodiment, the PLMN available indication is used to indicate that a home PLMN (Home PLMN, HPLMN for short) of the UE is available, or the PLMN available indication is used to indicate that an equivalent home PLMN (Equivalent Home PLMN, EHPLMN for short) of the UE is available.

Optionally, when the PLMN available indication is used to indicate that the EHPLMN of the UE is available, in step 102, before the base station receives the service request message sent by the UE, the base station may further receive an identifier, sent by the UE, of the EHPLMN selected by the UE; then, after determining the serving MME of the UE in step 102, the base station may further send the identifier of the EHPLMN selected by the UE to the serving MME of the UE. In this way, the serving MME of the UE may determine the target MME of redirection or the target PLMN of redirection according to the identifier of the EHPLMN selected by the UE.

In the foregoing embodiment, after a base station receives a temporary identifier and a PLMN available indication that are of a UE and sent by the UE, and receives a service request message sent by the UE, the base station determines a serving MME of the UE according to a GMMEI in the temporary identifier of the UE; then, the base station sends the service request message and the PLMN available indication to the serving MME of the UE, so that the serving MME of the UE sends a redirection indication, and the UE registers with a home PLMN. Therefore, in a network sharing scenario, the UE can select a home PLMN of the UE as a serving PLMN of the UE as early as possible.

Figure 2:
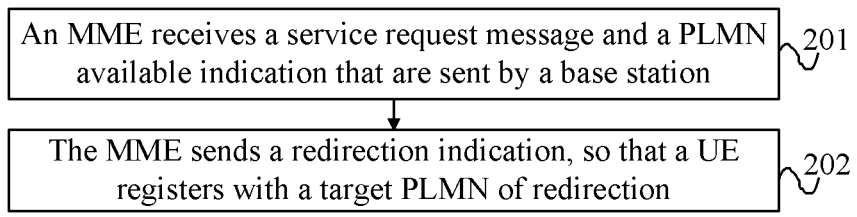
FIG. 2 is a flowchart of another embodiment of an access control method according to the present invention.

FIG. 2 is a flowchart of another embodiment of an access control method according to the present invention. As shown in FIG. 2, the access control method may include:

Step 201: An MME receives a service request message and a PLMN available indication that are sent by a base station.

The MME is a serving MME of a UE. The service request message and the PLMN available indication are sent to the MME after the base station receives a temporary identifier of the UE and the PLMN available indication that are sent by the UE, receives the service request message sent by the UE, and determines the serving MME of the UE according to a GMMEI in the temporary identifier of the UE, where the temporary identifier of the UE may be an S-TMSI.

Step 202: The MME sends a redirection indication, so that a UE registers with a target PLMN of redirection.

In an implementation manner of this embodiment, that the MME sends a redirection indication may be that: the MME sends a redirection message to the base station after receiving the PLMN available indication, where the redirection message carries the service request message and a cause of redirection. The cause of redirection may be that the UE is redirected to an HPLMN of the UE, or the UE is redirected to an EHPLMN of the UE, or a registered PLMN of the UE changes, or an HPLMN of the UE is available, or an EHPLMN of the UE is available.

The redirection message may further carry information about a target MME of redirection, where the information about the target MME of redirection may be an identifier of the target MME of redirection or an address of the target MME of redirection.

Alternatively, the redirection message may further carry an identifier of the target PLMN of redirection.

In another implementation manner of this embodiment, that the MME sends a redirection indication may be that: the MME sends a service response message to the UE after receiving the PLMN available indication, where the service response message carries the redirection indication, and a cause of redirection may be that the UE is redirected to an HPLMN of the UE, or the UE is redirected to an EHPLMN of the UE, or a registered PLMN of the UE changes, or an HPLMN of the UE is available, or an EHPLMN of the UE is available.

In this embodiment, the PLMN available indication is used to indicate that the HPLMN of the UE is available, or the PLMN available indication is used to indicate that the EHPLMN of the UE is available.

Optionally, when the PLMN available indication is used to indicate that the EHPLMN of the UE is available, before the MME sends the redirection indication, the MME may further receive an identifier, sent by the base station, of the EHPLMN selected by the UE; then, the MME determines the target MME of redirection or the target PLMN of redirection according to the identifier of the EHPLMN selected by the UE.

Specifically, that the MME determines the target MME of redirection according to the identifier of the EHPLMN selected by the UE may be that: the MME determines, according to the identifier of the EHPLMN selected by the UE, an MME to which the EHPLMN selected by the UE belongs, and determines that the MME to which the EHPLMN selected by the UE belongs is the target MME of redirection; or the MME reselects an EHPLMN for the UE according to the identifier of the EHPLMN selected by the UE, and determines that an MME to which the reselected EHPLMN belongs is the target MME of redirection.

After determining the target MME of redirection, information about the target MME of redirection is carried in the redirection message sent by the MME.

Likewise, that the MME determines the target PLMN of redirection according to the identifier of the EHPLMN selected by the UE may be that: the MME determines, according to the identifier of the EHPLMN selected by the UE, that the EHPLMN selected by the UE is the target PLMN of redirection; or the MME reselects an EHPLMN for the UE according to the identifier of the EHPLMN selected by the UE, and determines that the reselected EHPLMN is the target PLMN of redirection.

After determining the target PLMN of redirection, the identifier of the target PLMN of redirection is carried in the redirection message sent by the MME.

In the foregoing embodiment, after an MME receives a service request message and a PLMN available indication that are sent by a base station, the MME sends a redirection indication, so that a UE registers with a target PLMN of redirection. Therefore, in a network sharing scenario, the UE can select a home PLMN of the UE as a serving PLMN of the UE as early as possible.

Figure 3:
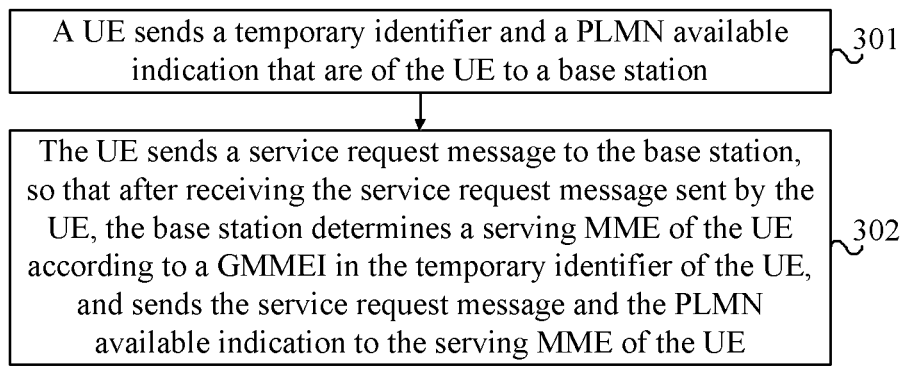
FIG. 3 is a flowchart of still another embodiment of an access control method according to the present invention.

FIG. 3 is a flowchart of still another embodiment of an access control method according to the present invention. As shown in FIG. 3, the access control method may include:

Step 301: A UE sends a temporary identifier and a PLMN available indication that are of the UE to a base station.

The temporary identifier of the UE may be an S-TMSI of the UE.

Step 302: The UE sends a service request message to the base station, so that after receiving the service request message sent by the UE, the base station determines a serving MME of the UE according to a GMMEI in the temporary identifier of the UE, and sends the service request message and the PLMN available indication to the serving MME of the UE.

Further, in step 302, after the UE sends the service request message to the base station, the UE may further receive a service response message sent by the serving MME of the UE, where the service response message carries a redirection indication, and a cause of redirection may be that the UE is redirected to an HPLMN of the UE, or the UE is redirected to an EHPLMN of the UE, or a registered PLMN of the UE changes, or an HPLMN of the UE is available, or an EHPLMN of the UE is available; and the service response message is sent to the UE after the serving MME of the UE receives the PLMN available indication sent by the base station.

The PLMN available indication is used to indicate that the home PLMN of the UE is available, or the PLMN available indication is used to indicate that an EHPLMN of the UE is available.

Optionally, when the PLMN available indication is used to indicate that the EHPLMN of the UE is available, in step 302, before the UE sends the service request message to the base station, the UE may further send an identifier of the EHPLMN selected by the UE to the base station, so that the base station sends the identifier of the EHPLMN selected by the UE to the serving MME of the UE, and the serving MME of the UE determines a target PLMN of redirection according to the EHPLMN selected by the UE. The target PLMN of redirection may be the EHPLMN of the UE.

In the foregoing embodiment, a UE sends a temporary identifier and a PLMN available indication that are of the UE to a base station, and then sends a service request message to the base station, so that after receiving the service request message sent by the UE, the base station determines a serving MME of the UE according to a GMMEI in the temporary identifier of the UE, and sends the service request message and the PLMN available indication to the serving MME of the UE. In this way, after the serving MME of the UE receives the service request message and the PLMN available indication that are sent by the base station, the serving MME of the UE sends a redirection indication, so that the UE registers with a target PLMN of redirection, where the target PLMN of redirection may be an EHPLMN of the UE. Therefore, in a network sharing scenario, the UE can select a home PLMN of the UE as a serving PLMN of the UE as early as possible.

Figure 4:
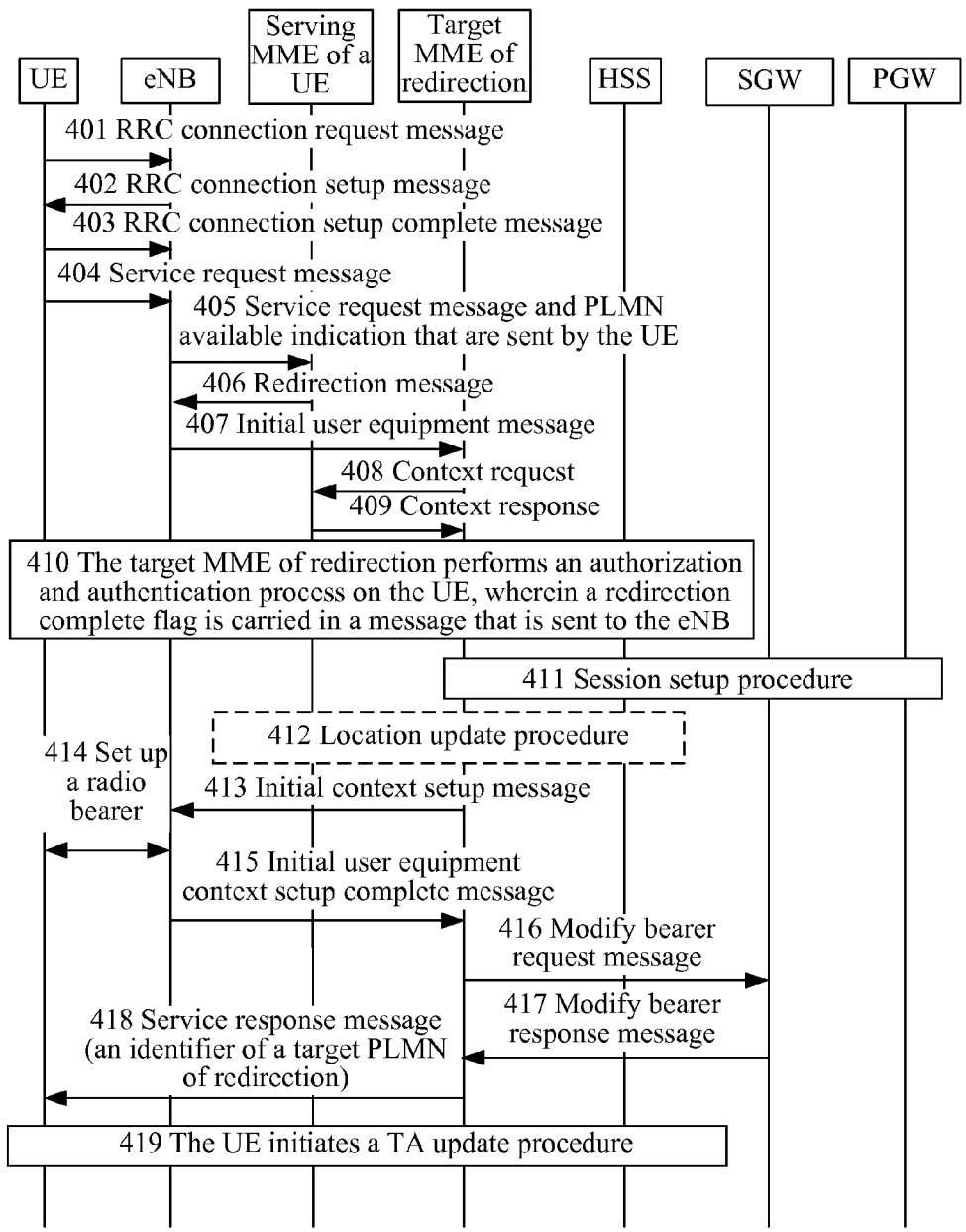
FIG. 4 is a flowchart of still another embodiment of an access control method according to the present invention.

FIG. 4 is a flowchart of still another embodiment of an access control method according to the present invention. As shown in FIG. 4, the access control method may include:

Step 401: A UE sends an RRC connection request (RRC Connection Request) message to an eNB, where the RRC connection request message carries a temporary identifier S-TMSI of the UE.

Step 402: The eNB sends an RRC connection setup (RRC Connection Setup) message to the UE.

Step 403: The UE sends an RRC connection setup complete (RRC Connection Setup Complete) message to the eNB to complete an RRC connection setup procedure, where the RRC connection setup complete message carries a PLMN available indication.

The PLMN available indication is used to indicate that an HPLMN of the UE is available, or the PLMN available indication is used to indicate that an EHPLMN of the UE is available.

Optionally, when the PLMN available indication is used to indicate that the EHPLMN of the UE is available, the RRC connection setup complete message further carries an identifier of the EHPLMN selected by the UE.

Step 404: The UE sends a service request (Service Request) message to the eNB, where the service request message is a non-access stratum (Non-Access Stratum, NAS for short) message.

Step 405: The eNB determines a serving MME of the UE according to a GMMEI in the S-TMSI of the UE, and sends, to the serving MME of the UE, the service request message and the PLMN available indication that are sent by the UE.

Optionally, if the RRC connection setup complete message carries the identifier of the EHPLMN selected by the UE, a base station sends the identifier of the EHPLMN selected by the UE to the serving MME of the UE.

Step 406: The serving MME of the UE sends a redirection message to the eNB.

The redirection message carries the service request message and a cause of redirection. The cause of redirection may be that the UE is redirected to an HPLMN of the UE, or the UE is redirected to an EHPLMN of the UE, or a registered PLMN of the UE changes, or an HPLMN of the UE is available, or an EHPLMN of the UE is available.

The redirection message may further carry information about a target MME of redirection, where the information about the target MME of redirection may be an identifier of the target MME of redirection or an address of the target MME of redirection. Alternatively, the redirection message may further carry an identifier of a target PLMN of redirection.

Optionally, if the serving MME of the UE receives the identifier, sent by the base station, of the EHPLMN selected by the UE, the serving MME of the UE may determine the target MME of redirection or the target PLMN of redirection according to the identifier of the EHPLMN selected by the UE.

Specifically, that the serving MME of the UE determines the target MME of redirection according to the identifier of the EHPLMN selected by the UE may be that: the serving MME of the UE determines, according to the identifier of the EHPLMN selected by the UE, an MME to which the EHPLMN selected by the UE belongs, and determines that the MME to which the EHPLMN selected by the UE belongs is the target MME of redirection; or the serving MME of the UE reselects an EHPLMN for the UE according to the identifier of the EHPLMN selected by the UE, and determines that an MME to which the reselected EHPLMN belongs is the target MME of redirection.

After determining the target MME of redirection, the information about the target MME of redirection is carried in the redirection message sent by the serving MME of the UE.

Likewise, that the serving MME of the UE determines the target PLMN of redirection according to the identifier of the EHPLMN selected by the UE may be that: the serving MME of the UE determines, according to the identifier of the EHPLMN selected by the UE, that the EHPLMN selected by the UE is the target PLMN of redirection; or the serving MME of the UE reselects an EHPLMN for the UE according to the identifier of the EHPLMN selected by the UE, and determines that the reselected EHPLMN is the target PLMN of redirection.

After determining the target PLMN of redirection, the identifier of the target PLMN of redirection is carried in the redirection message sent by the serving MME of the UE.

Step 407: A base station sends an initial user equipment message (Initial UE Message) to a target MME of redirection, where the initial user equipment message carries the service request message and a redirection attempt flag.

Specifically, if the redirection message carries the information about the target MME of redirection, the base station may send the initial user equipment message to the target MME of redirection according to the information about the target MME of redirection.

Alternatively, if the redirection message carries the identifier of the target PLMN of redirection, the base station may determine, according to the identifier of the target PLMN of redirection, a target MME of redirection to which the target PLMN of redirection belongs, and sends the initial user equipment message to the target MME of redirection.

Step 408: The target MME of redirection sends a context request to the serving MME of the UE, so as to request context information of the UE.

Step 409: The serving MME of the UE sends a context response to the target MME of redirection.

Step 410: The target MME of redirection performs an authorization and authentication procedure on the UE, wherein a redirection complete flag is carried in a message, such as a downlink non-access stratum transport (Downlink NAS Transport, DL NAS Transport) message, that is sent to the eNB.

Step 411: The target MME of redirection sets up a bearer between an SGW and a PGW by using a session setup procedure.

Step 412: The target MME of redirection updates a location of the UE in an HSS by using a location update procedure.

Step 413: The target MME of redirection sends an initial context setup (Initial Context Setup) message to the eNB.

Step 414: Set up a radio bearer between the eNB and the UE.

Step 415: The eNB sends an initial user equipment context setup complete (Initial UE Context Setup Complete) message to the target MME of redirection.

Step 416: The target MME of redirection sends a modify bearer request (Modify Bearer Request) message to the SGW.

Step 417: The SGW sends a modify bearer response (Modify Bearer Response) message to the target MME of redirection.

Step 418: The target MME of redirection sends a service response message to the UE, where the service response message carries an identifier of a target PLMN of redirection.

The target PLMN of redirection may be the HPLMN of the UE or the EHPLMN of the UE.

Step 419: The UE initiates a tracking area (Tracking Area, TA for short) update procedure, and registers with the target PLMN of redirection.

In the foregoing embodiment, in a network sharing scenario, a UE can select a home PLMN of the UE as a serving PLMN of the UE as early as possible.

Figure 5:
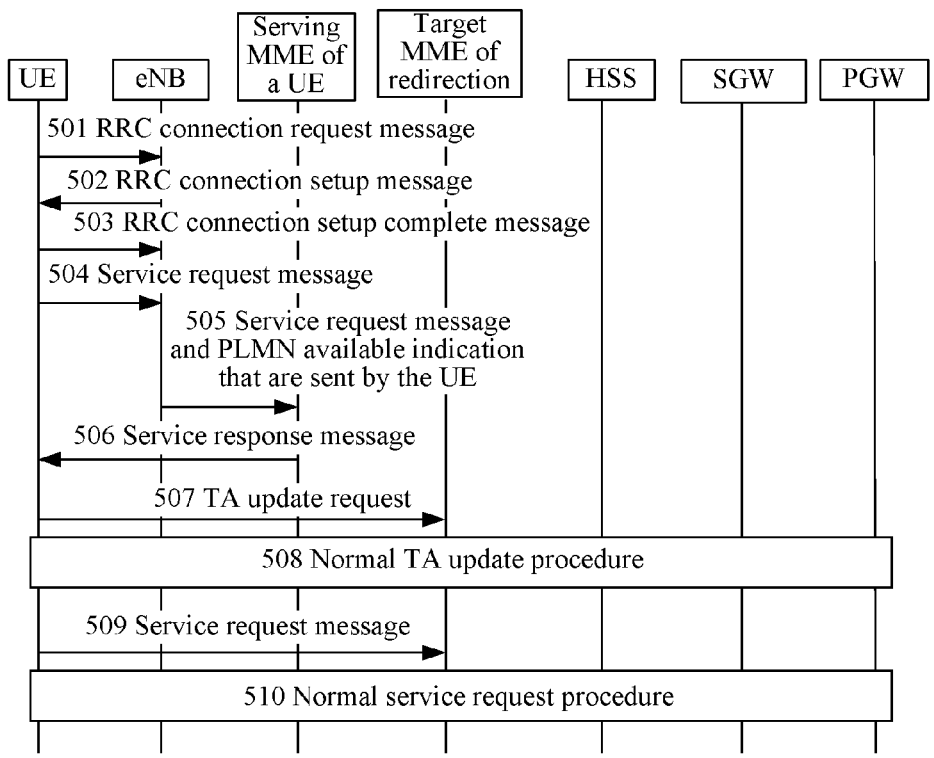
FIG. 5 is a flowchart of still another embodiment of an access control method according to the present invention.

FIG. 5 is a flowchart of still another embodiment of an access control method according to the present invention. As shown in FIG. 5, the access control method may include:

Step 501: A UE sends an RRC connection request (RRC Connection Request) message to an eNB, where the RRC connection request message carries a temporary identifier S-TMSI of the UE.

Step 502: The eNB sends an RRC connection setup (RRC Connection Setup) message to the UE.

Step 503: The UE sends an RRC connection setup complete (RRC Connection Setup Complete) message to the eNB to complete an RRC connection setup procedure, where the RRC connection setup complete message carries a PLMN available indication.

The PLMN available indication is used to indicate that an HPLMN of the UE is available, or the PLMN available indication is used to indicate that an EHPLMN of the UE is available.

Optionally, when the PLMN available indication is used to indicate that the EHPLMN of the UE is available, the RRC connection setup complete message further carries an identifier of the EHPLMN selected by the UE.

Step 504: The UE sends a service request (Service Request) message to the eNB, where the service request message is a NAS message.

Step 505: The eNB determines a serving MME of the UE according to a GMMEI in the S-TMSI of the UE, and sends, to the serving MME of the UE, the service request message and the PLMN available indication that are sent by the UE.

Optionally, if the RRC connection setup complete message carries the identifier of the EHPLMN selected by the UE, a base station sends the identifier of the EHPLMN selected by the UE to the serving MME of the UE.

Step 506: The serving MME of the UE sends a service response message to the UE, where the service response message carries a redirection indication, and a cause of redirection may be that the UE is redirected to an HPLMN of the UE, or the UE is redirected to an EHPLMN of the UE, or a registered PLMN of the UE changes, or an HPLMN of the UE is available, or an EHPLMN of the UE is available.

Optionally, if the serving MME of the UE receives the identifier, sent by the base station, of the EHPLMN selected by the UE, the serving MME of the UE may determine a target PLMN of redirection according to the EHPLMN selected by the UE. The target PLMN of redirection may be the EHPLMN of the UE.

Step 507: The UE sends a TA update request to a target MME of redirection.

Specifically, after receiving the redirection indication sent by the serving MME of the UE, the UE may determine the target MME of redirection according to the cause of redirection, and then send the TA update request to the target MME of redirection.

Step 508: A normal TA update procedure is performed.

Step 509: The UE sends a service request message to the target MME of redirection.

Step 510: A normal service request procedure is performed.

In the foregoing embodiment, in a network sharing scenario, a UE can select a home PLMN of the UE as a serving PLMN of the UE as early as possible.

Figure 6:
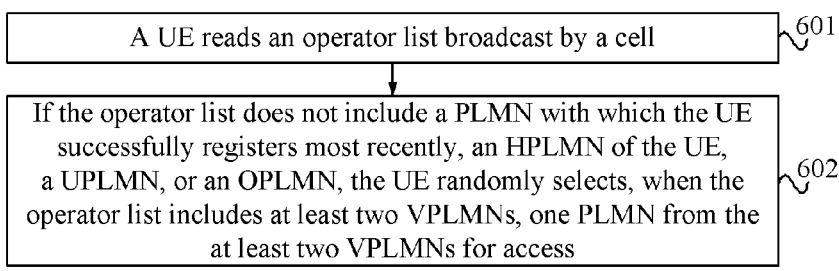
FIG. 6 is a flowchart of still another embodiment of an access control method according to the present invention.

FIG. 6 is a flowchart of still another embodiment of an access control method according to the present invention. As shown in FIG. 6, the access control method may include:

Step 601: A UE reads an operator list broadcast by a cell.

Step 602: If the operator list does not include a PLMN with which the UE successfully registers most recently, an HPLMN of the UE, a user controlled PLMN (User Controlled PLMN, UPLMN for short), or an operator controlled PLMN (Operator Controlled PLMN, OPLMN for short), the UE randomly selects, when the operator list includes at least two visited PLMNs (Visited PLMN, VPLMN for short), one PLMN from the at least two VPLMNs for access.

In the foregoing embodiment, when accessing a shared network, a roaming subscriber can equally access multiple PLMNs of multiple operators, preventing a case in which an operator ranking first in an operator list broadcast by a cell is overloaded due to access of too many roaming subscribers, or achieves an excessive income from roaming subscribers.

Figure 7:
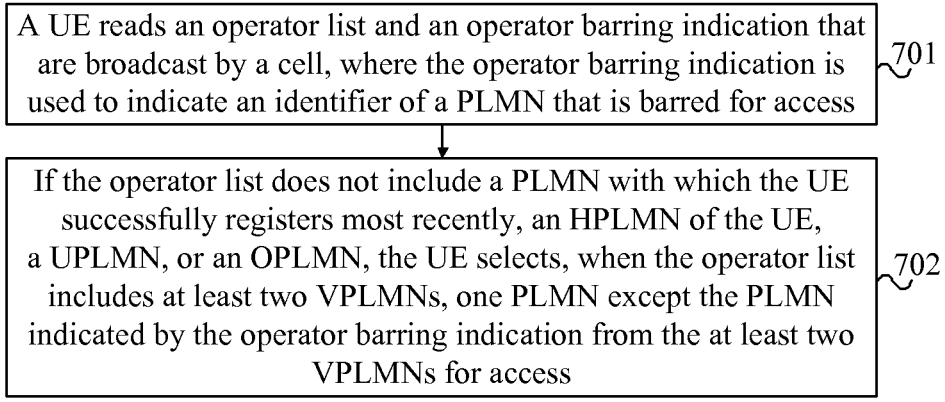
FIG. 7 is a flowchart of still another embodiment of an access control method according to the present invention.

FIG. 7 is a flowchart of still another embodiment of an access control method according to the present invention. As shown in FIG. 7, the access control method may include:

Step 701: A UE reads an operator list and an operator barring indication that are broadcast by a cell, where the operator barring indication is used to indicate an identifier of a PLMN that is barred for access.

Specifically, when a core network node of an operator is overloaded or a quantity of access subscribers of an operator reaches an upper limit of a rented share, the operator barring indication may be set to forbid subsequent access of a roaming subscriber to this operator.

Step 702: If the operator list does not include a PLMN with which the UE successfully registers most recently, an HPLMN of the UE, a UPLMN of the UE, or an OPLMN of the UE, the UE selects, when the operator list includes at least two VPLMNs, one PLMN except the PLMN indicated by the operator barring indication from the at least two VPLMNs for access.

In the foregoing embodiment, when a core network node of an operator is overloaded or a quantity of access subscribers of an operator reaches an upper limit of a rented share, subsequent access of a roaming subscriber can be forbidden, to prevent overload of an operator.

Figure 8:
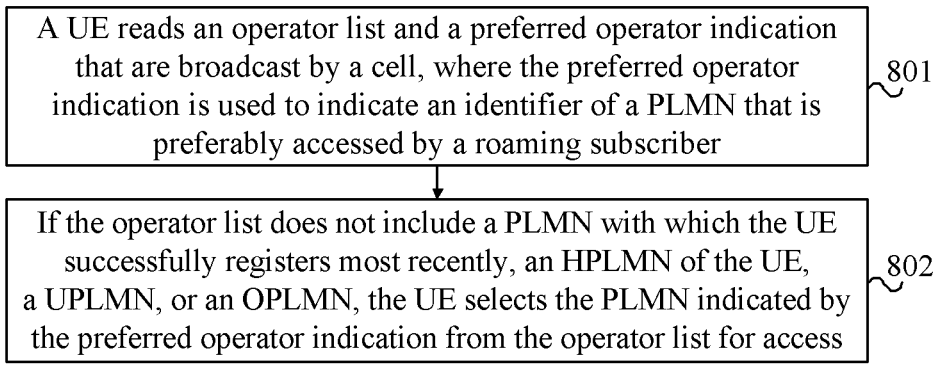
FIG. 8 is a flowchart of still another embodiment of an access control method according to the present invention.

FIG. 8 is a flowchart of still another embodiment of an access control method according to the present invention. As shown in FIG. 8, the access control method may include:

Step 801: A UE reads an operator list and a preferred operator indication that are broadcast by a cell, where the preferred operator indication is used to indicate an identifier of a PLMN that is preferably accessed by a roaming subscriber.

Step 802: If the operator list does not include a PLMN with which the UE successfully registers most recently, an HPLMN of the UE, a UPLMN of the UE, or an OPLMN of the UE, the UE selects the PLMN indicated by the preferred operator indication from the operator list for access.

In the foregoing embodiment, a roaming subscriber can access an operator indicated by a preferred operator indication.

Figure 9:
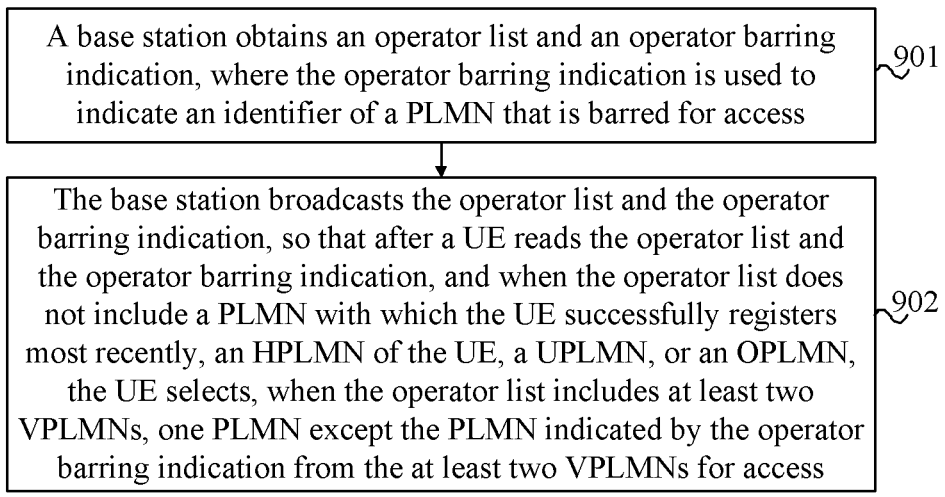
FIG. 9 is a flowchart of still another embodiment of an access control method according to the present invention.

FIG. 9 is a flowchart of still another embodiment of an access control method according to the present invention. As shown in FIG. 9, the access control method may include:

Step 901: A base station obtains an operator list and an operator barring indication, where the operator barring indication is used to indicate an identifier of a PLMN that is barred for access.

Specifically, when a core network node of an operator is overloaded or a quantity of access subscribers of an operator reaches an upper limit of a rented share, the operator barring indication may be set to forbid subsequent access of a roaming subscriber to this operator.

Step 902: The base station broadcasts the operator list and the operator barring indication, so that after a UE reads the operator list and the operator barring indication, and when the operator list does not include a PLMN with which the UE successfully registers most recently, an HPLMN of the UE, a UPLMN of the UE, or an OPLMN of the UE, the UE selects, when the operator list includes at least two VPLMNs, one PLMN except the PLMN indicated by the operator barring indication from the at least two VPLMNs for access.

In the foregoing embodiment, when a core network node of an operator is overloaded or a quantity of access subscribers of an operator reaches an upper limit of a rented share, subsequent access of a roaming subscriber can be forbidden, to prevent overload of an operator.

Figure 10:
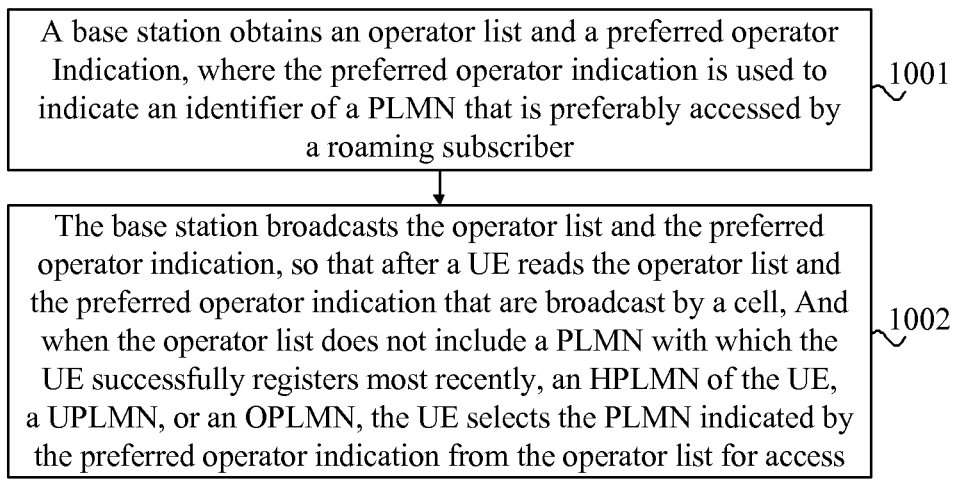
FIG. 10 is a flowchart of still another embodiment of an access control method according to the present invention.

FIG. 10 is a flowchart of still another embodiment of an access control method according to the present invention. As shown in FIG. 10, the access control method may include:

Step 1001: A base station obtains an operator list and a preferred operator indication, where the preferred operator indication is used to indicate an identifier of a PLMN that is preferably accessed by a roaming subscriber.

Step 1002: The base station broadcasts the operator list and the preferred operator indication, so that after a UE reads the operator list and the preferred operator indication that are broadcast by a cell, and when the operator list does not include a PLMN with which the UE successfully registers most recently, an HPLMN of the UE, a UPLMN of the UE, or an OPLMN of the UE, the UE selects the PLMN indicated by the preferred operator indication from the operator list for access.

In the foregoing embodiment, a roaming subscriber can access an operator indicated by a preferred operator indication.

Persons of ordinary skill in the art may understand that all or some of the steps of the method embodiments may be implemented by a program instructing relevant hardware. The foregoing program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 11:
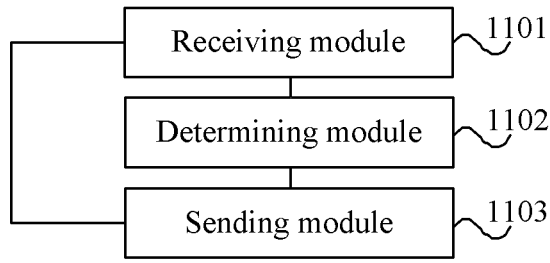
FIG. 11 is a schematic structural diagram of an embodiment of a base station according to the present invention.

FIG. 11 is a schematic structural diagram of an embodiment of a base station according to the present invention. The base station in this embodiment may implement a procedure of the embodiment shown in FIG. 1 of the present invention. As shown in FIG. 11, the base station may include: a receiving module 1101, a determining module 1102, and a sending module 1103.

The receiving module 1101 is configured to: receive a temporary identifier and a PLMN available indication that are of a UE and sent by the UE; and receive a service request message sent by the UE, where the temporary identifier of the UE may be an S-TMSI.

The determining module 1102 is configured to determine a serving MME of the UE according to a GMMEI in the temporary identifier of the UE received by the receiving module 1101.

The sending module 1103 is configured to send the service request message received by the receiving module 1101 and the PLMN available indication received by the receiving module 1101 to the serving MME of the UE determined by the determining module 1102.

In an implementation manner of this embodiment, the receiving module 1101 is further configured to: receive, after the sending module 1103 sends the service request message and the PLMN available indication, a redirection message sent by the serving MME of the UE, where the redirection message carries the service request message, a cause of redirection, and information about a target MME of redirection, and the redirection message is sent to the base station after the serving MME of the UE receives the PLMN available indication; and receive, after the sending module 1103 sends an initial user equipment message, a redirection complete indication sent by the target MME of redirection, where the information about the target MME of redirection may be an identifier of the target MME of redirection or an address of the target MME of redirection.

The sending module 1103 is further configured to send the initial user equipment message to the target MME of redirection according to the information about the target MME of redirection received by the receiving module 1101, where the initial user equipment message carries the service request message and a redirection attempt flag.

In another implementation manner of this embodiment, the receiving module 1101 is further configured to: receive, after the sending module 1103 sends the service request message and the PLMN available indication, a redirection message sent by the serving MME of the UE, where the redirection message carries the service request message, a cause of redirection, and an identifier of a target PLMN of redirection, and the redirection message is sent to the base station after the serving MME of the UE receives the PLMN available indication; and receive, after the sending module 1103 sends an initial user equipment message, a redirection complete indication sent by the target MME of redirection.

The determining module 1102 is further configured to determine, according to the identifier of the target PLMN of redirection received by the receiving module 1101, a target MME of redirection to which the target PLMN of redirection belongs.

The sending module 1103 is further configured to send the initial user equipment message to the target MME of redirection determined by the determining module 1102, where the initial user equipment message carries the service request message and a redirection attempt flag.

In the foregoing two implementation manners of this embodiment, the cause of redirection may be that the UE is redirected to an HPLMN of the UE, or the UE is redirected to an EHPLMN of the UE, or a registered PLMN of the UE changes, or an HPLMN of the UE is available, or an EHPLMN of the UE is available.

In hardware implementation, the sending module 1103 may be a transmitter or a transceiver, the receiving module 1101 may be a receiver or a transceiver, and the sending module 1103 and the receiving module 1101 may be integrated to form a transceiving unit, which is corresponding to a transceiver in the hardware implementation. The determining module 1102 may be built in or independent of a processor of a base station in a hardware form, or may be stored in a memory of the base station in a software form, so as to be invoked by the processor to perform an operation corresponding to each of the foregoing modules. The processor may be a central processing unit (CPU), a microprocessor, a single-chip microcomputer, or the like.

In the foregoing embodiment, after a receiving module 1101 receives a temporary identifier and a PLMN available indication that are of a UE and sent by the UE, and receives a service request message sent by the UE, a determining module 1102 determines a serving MME of the UE according to a GMMEI in the temporary identifier of the UE; then, a sending module 1103 sends the service request message and the PLMN available indication to the serving MME of the UE, so that the serving MME of the UE sends a redirection indication, and the UE registers with a home PLMN. Therefore, in a network sharing scenario, the UE can select a home PLMN of the UE as a serving PLMN of the UE as early as possible.

Figure 12:
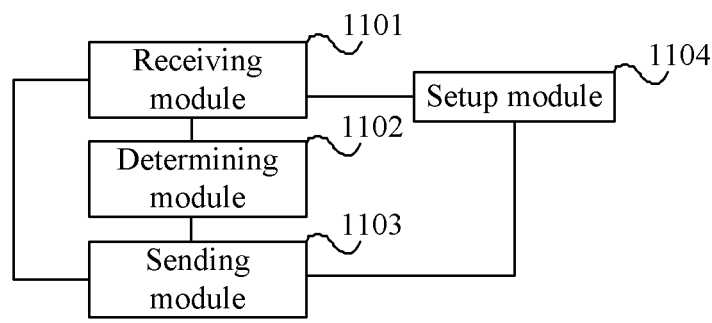
FIG. 12 is a schematic structural diagram of another embodiment of a base station according to the present invention.

FIG. 12 is a schematic structural diagram of another embodiment of a base station according to the present invention. Compared with the base station shown in FIG. 11, a difference lies in that the base station shown in FIG. 12 may further include a setup module 1104.

The receiving module 1101 is further configured to receive, after receiving the redirection complete indication, an initial context setup message sent by the target MME of redirection, where the initial context setup message is sent to the base station after the target MME of redirection sets up a bearer between an SGW and a PGW, and updates a location of the UE in an HSS.

The setup module 1104 is configured to set up a radio bearer between the base station and the UE.

The sending module 1103 is further configured to send an initial user equipment context setup complete message to the target MME of redirection after the setup module 1104 sets up the radio bearer between the base station and the UE, so that the target MME of redirection sends a service response message to the UE after performing bearer modification, where the service response message carries the identifier of the target PLMN of redirection, so that the UE registers with the target PLMN of redirection.

In this embodiment, the PLMN available indication received by the receiving module 1101 is used to indicate that an HPLMN of the UE is available, or the PLMN available indication received by the receiving module 1101 is used to indicate that an EHPLMN of the UE is available.

Optionally, the receiving module 1101 is further configured to: when the PLMN available indication received by the receiving module 1101 is used to indicate that the EHPLMN of the UE is available, receive, before receiving the service request message sent by the UE, an identifier, sent by the UE, of the EHPLMN selected by the UE.

The sending module 1103 is further configured to send, after the determining module 1102 determines the serving MME of the UE, the identifier of the EHPLMN selected by the UE to the serving MME of the UE.

In hardware implementation, the sending module 1103 may be a transmitter or a transceiver, the receiving module 1101 may be a receiver or a transceiver, and the sending module 1103 and the receiving module 1101 may be integrated to form a transceiving unit, which is corresponding to a transceiver in the hardware implementation. The determining module 1102 and the setup module 1104 may be built in or independent of a processor of a base station in a hardware form, or may be stored in a memory of the base station in a software form, so as to be invoked by the processor to perform an operation corresponding to each of the foregoing modules. The processor may be a central processing unit (CPU), a microprocessor, a single-chip microcomputer, or the like.

In the foregoing embodiment, in a network sharing scenario, a UE can select a home PLMN of the UE as a serving PLMN of the UE as early as possible.

Figure 13:
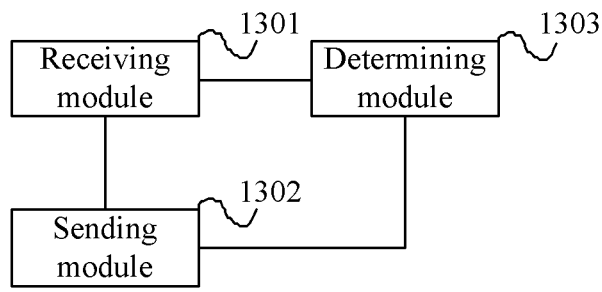
FIG. 13 is a schematic structural diagram of an embodiment of a mobility management entity according to the present invention.

FIG. 13 is a schematic structural diagram of an embodiment of a mobility management entity according to the present invention. The MME in this embodiment may implement a procedure of the embodiment shown in FIG. 2 of the present invention. As shown in FIG. 13, the MME may include a receiving module 1301 and a sending module 1302.

The receiving module 1301 is configured to receive a service request message and a PLMN available indication that are sent by a base station, where the MME is a serving MME of a UE, and the service request message and the PLMN available indication are sent to the MME after the base station receives a temporary identifier of the UE and the PLMN available indication that are sent by the UE, receives the service request message sent by the UE, and determines the serving MME of the UE according to a GMMEI in the temporary identifier of the UE.

The sending module 1302 is configured to send a redirection indication, so that the UE registers with a target PLMN of redirection.

In an implementation manner of this embodiment, the sending module 1302 is specifically configured to send a redirection message to the base station after the receiving module 1301 receives the PLMN available indication, where the redirection message carries the service request message and a cause of redirection, and the cause of redirection includes that the UE is redirected to an HPLMN of the UE, or the UE is redirected to an EHPLMN of the UE, or a registered PLMN of the UE changes, or an HPLMN of the UE is available, or an EHPLMN of the UE is available.

Further, the redirection message sent by the sending module 1302 further carries information about a target MME of redirection, where the information about the target MME of redirection may be an identifier of the target MME of redirection or an address of the target MME of redirection.

Alternatively, the redirection message sent by the sending module 1302 further carries an identifier of the target PLMN of redirection.

In another implementation manner of this embodiment, the sending module 1302 is specifically configured to send a service response message to the UE after receiving the PLMN available indication, where the service response message carries the redirection indication, and a cause of redirection may be that the UE is redirected to an HPLMN of the UE, or the UE is redirected to an EHPLMN of the UE, or a registered PLMN of the UE changes, or an HPLMN of the UE is available, or an EHPLMN of the UE is available.

In this embodiment, the PLMN available indication received by the receiving module 1301 is used to indicate that the HPLMN of the UE is available, or the PLMN available indication received by the receiving module 1301 is used to indicate that the EHPLMN of the UE is available.

Further, in still another implementation manner of this embodiment, the MME may further include a determining module 1303.

The receiving module 1301 is further configured to: when the PLMN available indication received by the receiving module 1301 is used to indicate that the EHPLMN of the UE is available, receive, before the sending module 1302 sends the redirection indication, an identifier, sent by the base station, of the EHPLMN selected by the UE.

The determining module 1303 is configured to determine the target MME of redirection or the target PLMN of redirection according to the identifier, received by the receiving module 1301, of the EHPLMN selected by the UE.

Specifically, that the determining module 1303 determines the target MME of redirection according to the identifier of the EHPLMN selected by the UE may be that: the determining module 1303 determines, according to the identifier of the EHPLMN selected by the UE, an MME to which the EHPLMN selected by the UE belongs, and determines that the MME to which the EHPLMN selected by the UE belongs is the target MME of redirection; or the determining module 1303 reselects an EHPLMN for the UE according to the identifier of the EHPLMN selected by the UE, and determines that an MME to which the reselected EHPLMN belongs is the target MME of redirection.

After the determining module 1303 determines the target MME of redirection, the information about the target MME of redirection is carried in the redirection message sent by the sending module 1302.

Likewise, that the determining module 1303 determines the target PLMN of redirection according to the identifier of the EHPLMN selected by the UE may be that: the determining module 1303 determines, according to the identifier of the EHPLMN selected by the UE, that the EHPLMN selected by the UE is the target PLMN of redirection; or the determining module 1303 reselects an EHPLMN for the UE according to the identifier of the EHPLMN selected by the UE, and determines that the reselected EHPLMN is the target PLMN of redirection.

After the determining module 1303 determines the target PLMN of redirection, the identifier of the target PLMN of redirection is carried in the redirection message sent by sending module 1302.

In hardware implementation, the sending module 1302 may be a transmitter or a transceiver, the receiving module 1301 may be a receiver or a transceiver, and the sending module 1302 and the receiving module 1301 may be integrated to form a transceiving unit, which is corresponding to a transceiver in the hardware implementation. The determining module 1303 may be built in or independent of a processor of a base station in a hardware form, or may be stored in a memory of the base station in a software form, so as to be invoked by the processor to perform an operation corresponding to each of the foregoing modules. The processor may be a central processing unit (CPU), a microprocessor, a single-chip microcomputer, or the like.

In the foregoing embodiment, after a receiving module 1301 receives a service request message and a PLMN available indication that are sent by a base station, a sending module 1302 sends a redirection indication, so that a UE registers with a target PLMN of redirection. Therefore, in a network sharing scenario, the UE can select a home PLMN of the UE as a serving PLMN of the UE as early as possible.

Figure 14:
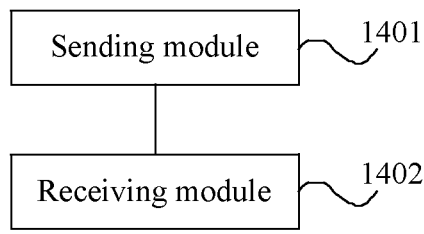
FIG. 14 is a schematic structural diagram of an embodiment of user equipment according to the present invention.

FIG. 14 is a schematic structural diagram of an embodiment of user equipment according to the present invention. The UE in this embodiment may implement a procedure of the embodiment shown in FIG. 3 of the present invention. As shown in FIG. 14, the UE may include a sending module 1401.

The sending module 1401 is configured to: send a temporary identifier and a PLMN available indication that are of the UE to a base station; and send a service request message to the base station, so that after receiving the service request message sent by the UE, the base station determines a serving MME of the UE according to a GMMEI in the temporary identifier of the UE, and sends the service request message and the PLMN available indication to the serving MME of the UE. The temporary identifier of the UE may be an S-TMSI of the UE.

Further, in an implementation manner of this embodiment, the UE may further include a receiving module 1402.

The receiving module 1402 is configured to receive, after the sending module 1401 sends the service request message to the base station, a service response message sent by the serving MME of the UE, where the service response message carries a redirection indication, and a cause of redirection may be that the UE is redirected to an HPLMN of the UE, or the UE is redirected to an EHPLMN of the UE, or a registered PLMN of the UE changes, or an HPLMN of the UE is available, or an EHPLMN of the UE is available; and the service response message is sent to the UE after the serving MME of the UE receives the PLMN available indication sent by the base station.

The PLMN available indication sent by the sending module 1401 is used to indicate that the HPLMN of the UE is available, or the PLMN available indication sent by the sending module 1401 is used to indicate that the EHPLMN of the UE is available.

The sending module 1401 is further configured to: when the PLMN available indication sent by the sending module 1401 is used to indicate that the EHPLMN of the UE is available, send, before sending the service request message to the base station, an identifier of the EHPLMN selected by the UE to the base station, so that the base station sends the identifier of the EHPLMN selected by the UE to the serving MME of the UE, and the serving MME of the UE determines a target PLMN of redirection according to the EHPLMN selected by the UE.

In hardware implementation, the sending module 1401 may be a transmitter or a transceiver, the receiving module 1402 may be a receiver or a transceiver, and the sending module 1401 and the receiving module 1402 may be integrated to form a transceiving unit, which is corresponding to a transceiver in the hardware implementation.

In the foregoing embodiment, a sending module 1401 sends a temporary identifier and a PLMN available indication that are of a UE to a base station, and then sends a service request message to the base station, so that after receiving the service request message sent by the UE, the base station determines a serving MME of the UE according to a GMMEI in the temporary identifier of the UE, and sends the service request message and the PLMN available indication to the serving MME of the UE. In this way, after the serving MME of the UE receives the service request message and the PLMN available indication that are sent by the base station, the serving MME of the UE sends a redirection indication, so that the UE registers with a target PLMN of redirection, where the target PLMN of redirection may be an EHPLMN of the UE. Therefore, in a network sharing scenario, the UE can select a home PLMN of the UE as a serving PLMN of the UE as early as possible.

Figure 15:
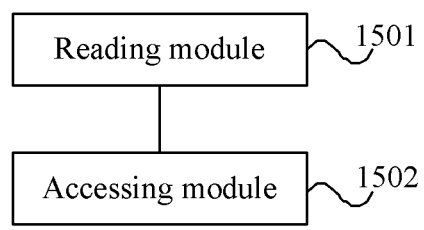
FIG. 15 is a schematic structural diagram of another embodiment of user equipment according to the present invention.

FIG. 15 is a schematic structural diagram of another embodiment of user equipment according to the present invention. The UE in this embodiment may implement a procedure of the embodiment shown in FIG. 6 of the present invention. As shown in FIG. 15, the UE may include a reading module 1501 and an accessing module 1502.

The reading module 1501 is configured to read an operator list broadcast by a cell.

The accessing module 1502 is configured to: when the operator list read by the reading module 1501 does not include a PLMN with which the UE successfully registers most recently, an HPLMN of the UE, a UPLMN of the UE, or an OPLMN of the UE, randomly select, if the operator list includes at least two VPLMNs, one PLMN from the at least two VPLMNs for access.

In hardware implementation, the reading module 1501 and the accessing module 1502 may be built in or independent of a processor of a base station in a hardware form, or may be stored in a memory of the base station in a software form, so as to be invoked by the processor to perform an operation corresponding to each of the foregoing modules. The processor may be a central processing unit (CPU), a microprocessor, a single-chip microcomputer, or the like.

In the foregoing embodiment, when accessing a shared network, a roaming subscriber can equally access multiple operators, preventing a case in which an operator ranking first in an operator list broadcast by a cell is overloaded due to access of too many roaming subscribers, or achieves an excessive income from roaming subscribers.

Figure 16:
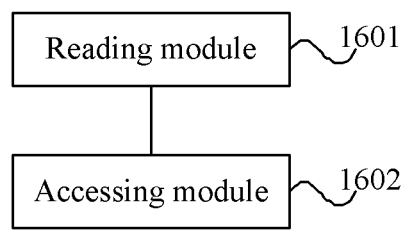
FIG. 16 is a schematic structural diagram of still another embodiment of user equipment according to the present invention.

FIG. 16 is a schematic structural diagram of still another embodiment of user equipment according to the present invention. The UE in this embodiment may implement a procedure of the embodiment shown in FIG. 7 of the present invention. As shown in FIG. 16, the UE may include a reading module 1601 and an accessing module 1602.

The reading module 1601 is configured to read an operator list and an operator barring indication that are broadcast by a cell, where the operator barring indication is used to indicate an identifier of a PLMN that is barred for access.

The accessing module 1602 is configured to: when the operator list read by the reading module 1601 does not include a PLMN with which the UE successfully registers most recently, an HPLMN of the UE, a UPLMN of the UE, or an OPLMN of the UE, select, if the operator list includes at least two VPLMNs, one PLMN except the PLMN indicated by the operator barring indication from the at least two VPLMNs for access.

In hardware implementation, the reading module 1601 and the accessing module 1602 may be built in or independent of a processor of a base station in a hardware form, or may be stored in a memory of the base station in a software form, so as to be invoked by the processor to perform an operation corresponding to each of the foregoing modules. The processor may be a central processing unit (CPU), a microprocessor, a single-chip microcomputer, or the like.

In the foregoing embodiment, when a core network node of an operator is overloaded or a quantity of access subscribers of an operator reaches an upper limit of a rented share, subsequent access of a roaming subscriber can be forbidden, to prevent overload of an operator.

Figure 17:
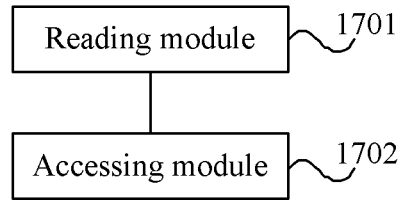
FIG. 17 is a schematic structural diagram of still another embodiment of user equipment according to the present invention.

FIG. 17 is a schematic structural diagram of still another embodiment of user equipment according to the present invention. The UE in this embodiment may implement a procedure of the embodiment shown in FIG. 8 of the present invention. As shown in FIG. 17, the UE may include a reading module 1701 and an accessing module 1702.

The reading module 1701 is configured to read an operator list and a preferred operator indication that are broadcast by a cell, where the preferred operator indication is used to indicate an identifier of a PLMN that is preferably accessed by a roaming subscriber.

The accessing module 1702 is configured to: when the operator list does not include a PLMN with which the UE successfully registers most recently, a home PLMN of the UE, a UPLMN, or an OPLMN, select the PLMN indicated by the preferred operator indication from the operator list for access.

In hardware implementation, the reading module 1701 and the accessing module 1702 may be built in or independent of a processor of a base station in a hardware form, or may be stored in a memory of the base station in a software form, so as to be invoked by the processor to perform an operation corresponding to each of the foregoing modules. The processor may be a central processing unit (CPU), a microprocessor, a single-chip microcomputer, or the like.

In the foregoing embodiment, a roaming subscriber can access an operator indicated by a preferred operator indication.

Figure 18:
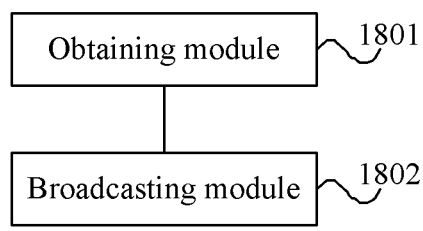
FIG. 18 is a schematic structural diagram of still another embodiment of a base station according to the present invention.

FIG. 18 is a schematic structural diagram of still another embodiment of a base station according to the present invention. The base station in this embodiment may implement a procedure of the embodiment shown in FIG. 9 of the present invention. As shown in FIG. 18, the base station may include an obtaining module 1801 and a broadcasting module 1802.

The obtaining module 1801 is configured to obtain an operator list and an operator barring indication, where the operator barring indication is used to indicate an identifier of a PLMN that is barred for access.

The broadcasting module 1802 is configured to broadcast the operator list obtained by the obtaining module 1801 and the operator barring indication obtained by the obtaining module 1801, so that after a UE reads the operator list and the operator barring indication, and when the operator list does not include a PLMN with which the UE successfully registers most recently, an HPLMN of the UE, a UPLMN of the UE, or an OPLMN of the UE, the UE selects, when the operator list includes at least two VPLMNs, one PLMN except the PLMN indicated by the operator barring indication from the at least two VPLMNs for access.

In hardware implementation, the broadcasting module 1802 may be a transmitter or a transceiver, and the obtaining module 1801 may be built in or independent of a processor of a base station in a hardware form, or may be stored in a memory of the base station in a software form, so as to be invoked by the processor to perform an operation corresponding to each of the foregoing modules. The processor may be a central processing unit (CPU), a microprocessor, a single-chip microcomputer, or the like.

In the foregoing embodiment, when a core network node of an operator is overloaded or a quantity of access subscribers of an operator reaches an upper limit of a rented share, subsequent access of a roaming subscriber can be forbidden, to prevent overload of an operator.

Figure 19:
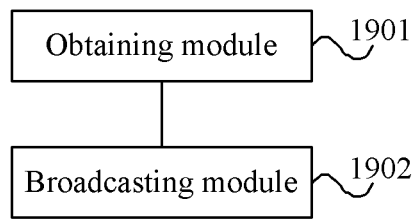
FIG. 19 is a schematic structural diagram of still another embodiment of a base station according to the present invention.

FIG. 19 is a schematic structural diagram of still another embodiment of a base station according to the present invention. The base station in this embodiment may implement a procedure of the embodiment shown in FIG. 10 of the present invention. As shown in FIG. 19, the base station may include an obtaining module 1901 and a broadcasting module 1902.

The obtaining module 1901 is configured to obtain an operator list and a preferred operator indication, where the preferred operator indication is used to indicate an identifier of a PLMN that is preferably accessed by a roaming subscriber.

The broadcasting module 1902 is configured to broadcast the operator list obtained by the obtaining module 1901 and the preferred operator indication obtained by the obtaining module 1901, so that after a UE reads the operator list and the preferred operator indication that are broadcast by a cell, and when the operator list does not include a PLMN with which the UE successfully registers most recently, an HPLMN of the UE, a UPLMN of the UE, or an OPLMN of the UE, the UE selects the PLMN indicated by the preferred operator indication from the operator list for access.

In hardware implementation, the broadcasting module 1902 may be a transmitter or a transceiver, and the obtaining module 1901 may be built in or independent of a processor of a base station in a hardware form, or may be stored in a memory of the base station in a software form, so as to be invoked by the processor to perform an operation corresponding to each of the foregoing modules. The processor may be a central processing unit (CPU), a microprocessor, a single-chip microcomputer, or the like.

In the foregoing embodiment, a roaming subscriber can access an operator indicated by a preferred operator indication.

Figure 20:
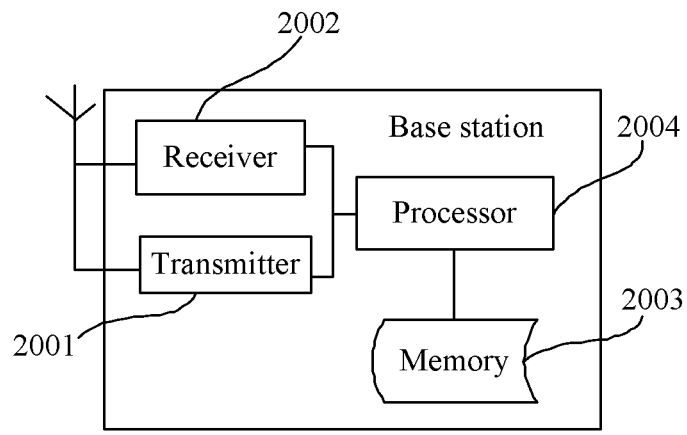
FIG. 20 is a schematic structural diagram of still another embodiment of a base station according to the present invention.

FIG. 20 is a schematic structural diagram of still another embodiment of a base station according to the present invention. As shown in FIG. 20, the base station may include a transmitter 2001, a receiver 2002, a memory 2003, and a processor 2004 that is separately connected to the transmitter 2001, the receiver 2002, and the memory 2003. Certainly, the base station may further include general components, such as an antenna, a baseband processing component, an intermediate/radio frequency processing component, and an input/output apparatus. This embodiment of the present invention sets no limitation thereto.

The memory 2003 stores a group of program code, and the processor 2004 is configured to invoke the program code stored in the memory 2003, so as to execute the following operations:

receiving a temporary identifier and a PLMN available indication that are of a UE and sent by the UE;

receiving a service request message sent by the UE, and determining a serving MME of the UE according to a GMMEI in the temporary identifier of the UE; and sending the service request message and the PLMN available indication to the serving MME of the UE.

It should be noted that, the base station shown in FIG. 20 may be configured to implement the method provided in the embodiment shown in FIG. 1, and descriptions of the temporary identifier of the UE, a redirection message that is sent by the serving MME of the UE and received by the base station, and the like are the same as those in the embodiment shown in FIG. 1 of the present invention, and details are not described herein again.

In the foregoing embodiment, in a network sharing scenario, a UE can select a home PLMN of the UE as a serving PLMN of the UE as early as possible.

Figure 21:
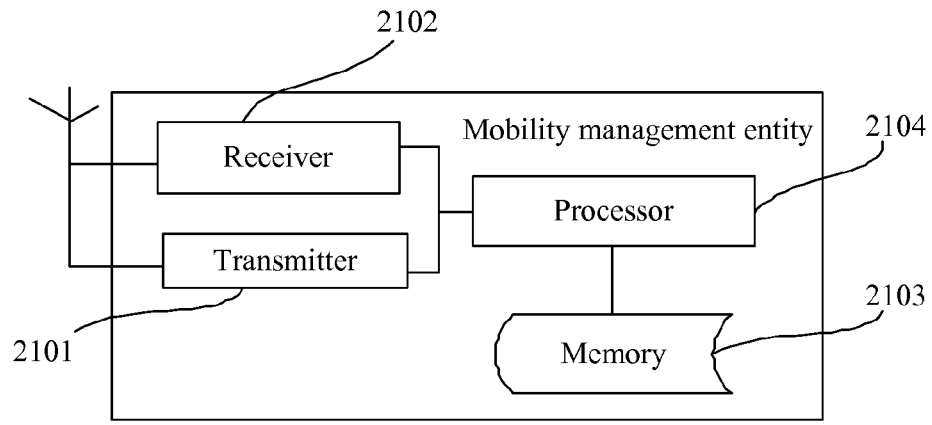
FIG. 21 is a schematic structural diagram of another embodiment of a mobility management entity according to the present invention.

FIG. 21 is a schematic structural diagram of another embodiment of a mobility management entity according to the present invention. As shown in FIG. 21, the MME may include a transmitter 2101, a receiver 2102, a memory 2103, and a processor 2104 that is separately connected to the transmitter 2101, the receiver 2102, and the memory 2103. Certainly, the MME may further include general components, such as an input/output apparatus. This embodiment of the present invention sets no limitation thereto.

The memory 2103 stores a group of program code, and the processor 2104 is configured to invoke the program code stored in the memory 2103, so as to execute the following operations:

receiving a service request message and a PLMN available indication that are sent by a base station; and sending a redirection indication, so that a UE registers with a target PLMN of redirection.

It should be noted that, the MME shown in FIG. 21 may be configured to implement the method provided in the embodiment shown in FIG. 2 of the present invention, and descriptions of the redirection indication sent by the MME and the like are the same as those in the embodiment shown in FIG. 2 of the present invention, and details are not described herein again.

In the foregoing embodiment, in a network sharing scenario, a UE can select a home PLMN of the UE as a serving PLMN of the UE as early as possible.

Figure 22:
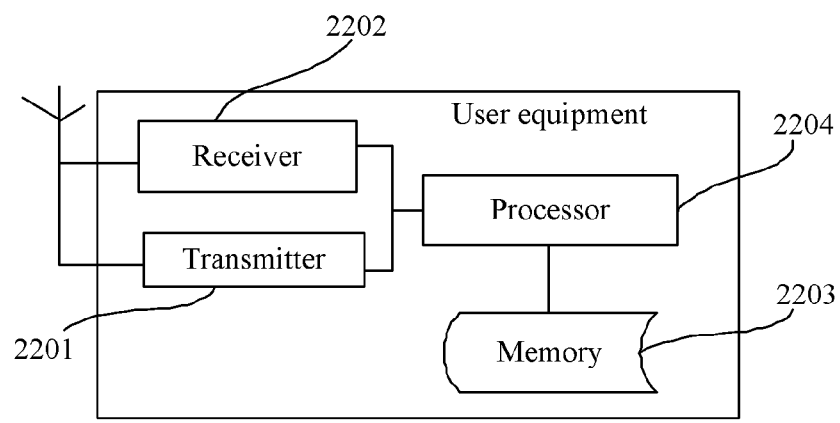
FIG. 22 is a schematic structural diagram of still another embodiment of user equipment according to the present invention.

FIG. 22 is a schematic structural diagram of still another embodiment of user equipment according to the present invention. As shown in FIG. 22, the UE may include a transmitter 2201, a receiver 2202, a memory 2203, and a processor 2204 that is separately connected to the transmitter 2201, the receiver 2202, and the memory 2203. Certainly, the UE may further include general components, such as an antenna, a baseband processing component, an intermediate/radio frequency processing component, and an input/output apparatus. This embodiment of the present invention sets no limitation thereto.

The memory 2203 stores a group of program code, and the processor 2204 is configured to invoke the program code stored in the memory 2203, so as to execute the following operations:

sending a temporary identifier and a PLMN available indication that are of the UE to a base station; and sending a service request message to the base station, so that after receiving the service request message sent by the UE, the base station determines a serving MME of the UE according to a GMMEI in the temporary identifier of the UE, and sends the service request message and the PLMN available indication to the serving MME of the UE.

It should be noted that, the UE shown in FIG. 22 may be configured to implement the method provided in the embodiment shown in FIG. 3 of the present invention, and descriptions of the temporary identifier of the UE, the PLMN available indication, and the like are the same as those in the embodiment shown in FIG. 3 of the present invention, and details are not described herein again.

In the foregoing embodiment, in a network sharing scenario, a UE can select a home PLMN of the UE as a serving PLMN of the UE as early as possible.

Figure 23:
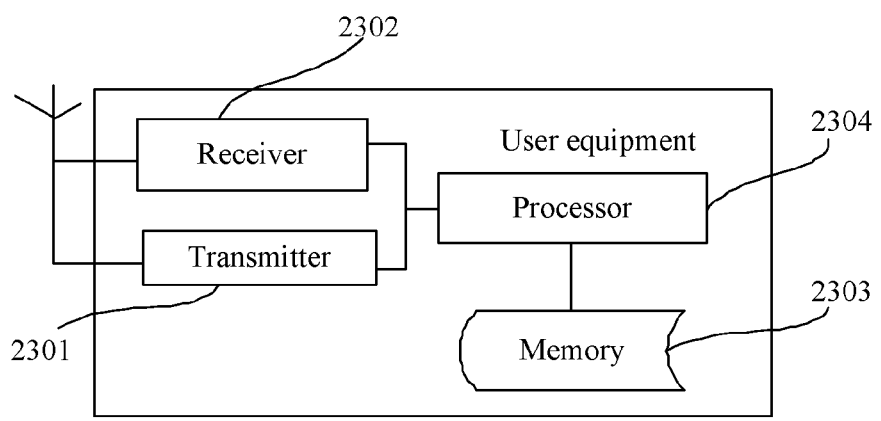
FIG. 23 is a schematic structural diagram of still another embodiment of user equipment according to the present invention.

FIG. 23 is a schematic structural diagram of still another embodiment of user equipment according to the present invention. As shown in FIG. 23, the UE may include a transmitter 2301, a receiver 2302, a memory 2303, and a processor 2304 that is separately connected to the transmitter 2301, the receiver 2302, and the memory 2303. Certainly, the UE may further include general components, such as an antenna, a baseband processing component, an intermediate/radio frequency processing component, and an input/output apparatus. This embodiment of the present invention sets no limitation thereto.

The memory 2303 stores a group of program code, and the processor 2304 is configured to invoke the program code stored in the memory 2303, so as to execute the following operations:

reading an operator list broadcast by a cell; and if the operator list does not include a PLMN with which the UE successfully registers most recently, an HPLMN of the UE, a UPLMN of the UE, or an OPLMN of the UE, randomly selecting, when the operator list includes at least two VPLMNs, one PLMN from the at least two VPLMNs for access.

It should be noted that the UE shown in FIG. 23 may be configured to implement the method provided in the embodiment shown in FIG. 6 of the present invention.

In the foregoing embodiment, when accessing a shared network, a roaming subscriber can equally access multiple operators, preventing a case in which an operator ranking first in an operator list broadcast by a cell is overloaded due to access of too many roaming subscribers, or achieves an excessive income from roaming subscribers.

Figure 24:
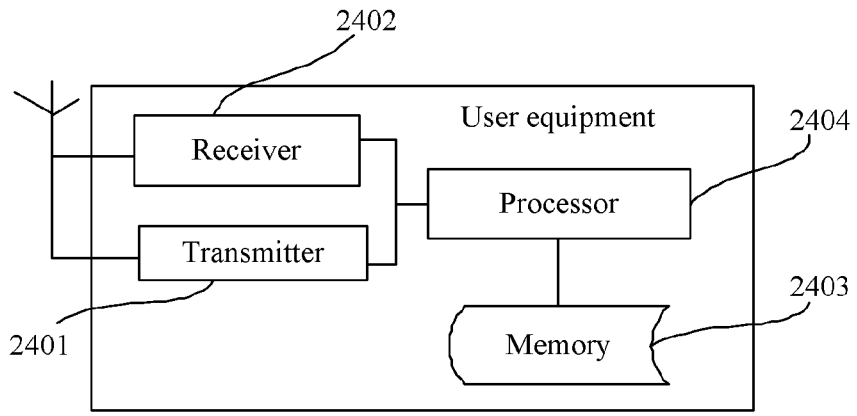
FIG. 24 is a schematic structural diagram of still another embodiment of user equipment according to the present invention.

FIG. 24 is a schematic structural diagram of still another embodiment of user equipment according to the present invention. As shown in FIG. 24, the UE may include a transmitter 2401, a receiver 2402, a memory 2403, and a processor 2404 that is separately connected to the transmitter 2401, the receiver 2402, and the memory 2403. Certainly, the UE may further include general components, such as an antenna, a baseband processing component, an intermediate/radio frequency processing component, and an input/output apparatus. This embodiment of the present invention sets no limitation thereto.

The memory 2403 stores a group of program code, and the processor 2404 is configured to invoke the program code stored in the memory 2403, so as to execute the following operations:

reading an operator list and an operator barring indication that are broadcast by a cell, where the operator barring indication is used to indicate an identifier of a PLMN that is barred for access; and if the operator list does not include a PLMN with which the UE successfully registers most recently, an HPLMN of the UE, a UPLMN of the UE, or an OPLMN of the UE, selecting, when the operator list includes at least two VPLMNs, one PLMN except the PLMN indicated by the operator barring indication from the at least two VPLMNs for access.

It should be noted that the UE shown in FIG. 24 may be configured to implement the method provided in the embodiment shown in FIG. 7 of the present invention.

In the foregoing embodiment, when a core network node of an operator is overloaded or a quantity of access subscribers of an operator reaches an upper limit of a rented share, subsequent access of a roaming subscriber can be forbidden, to prevent overload of an operator.

Figure 25:
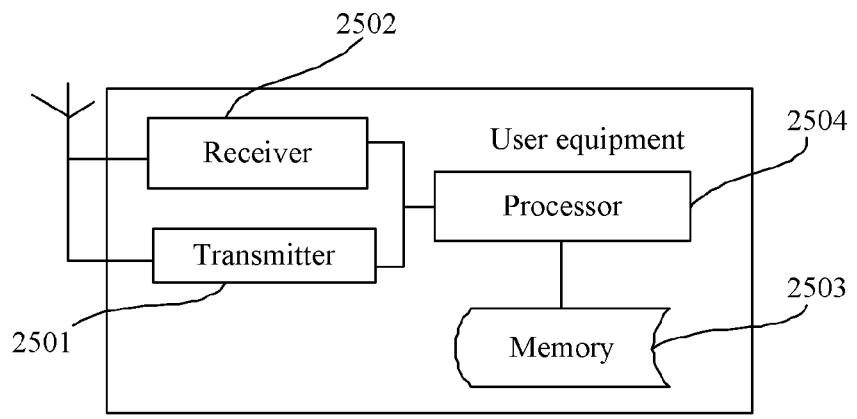
FIG. 25 is a schematic structural diagram of still another embodiment of user equipment according to the present invention.

FIG. 25 is a schematic structural diagram of still another embodiment of user equipment according to the present invention. As shown in FIG. 25, the UE may include a transmitter 2501, a receiver 2502, a memory 2503, and a processor 2504 that is separately connected to the transmitter 2501, the receiver 2502, and the memory 2503. Certainly, the UE may further include general components, such as an antenna, a baseband processing component, an intermediate/radio frequency processing component, and an input/output apparatus. This embodiment of the present invention sets no limitation thereto.

The memory 2503 stores a group of program code, and the processor 2504 is configured to invoke the program code stored in the memory 2503, so as to execute the following operations:

reading an operator list and a preferred operator indication that are broadcast by a cell, where the preferred operator indication is used to indicate an identifier of a PLMN that is preferably accessed by a roaming subscriber; and if the operator list does not include a PLMN with which the UE successfully registers most recently, an HPLMN of the UE, a UPLMN of the UE, or an OPLMN of the UE, selecting the PLMN indicated by the preferred operator indication from the operator list for access.

It should be noted that the UE shown in FIG. 25 may be configured to implement the method provided in the embodiment shown in FIG. 8 of the present invention.

In the foregoing embodiment, a roaming subscriber can access an operator indicated by a preferred operator indication.

Figure 26:
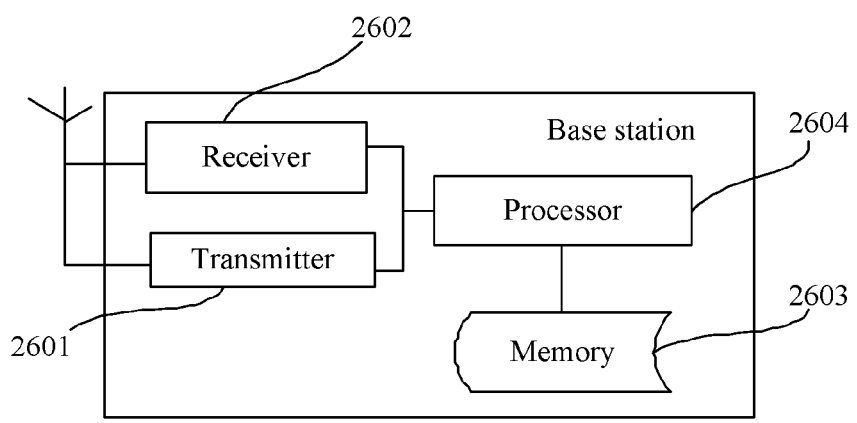
FIG. 26 is a schematic structural diagram of still another embodiment of a base station according to the present invention.

FIG. 26 is a schematic structural diagram of still another embodiment of a base station according to the present invention. As shown in FIG. 26, the base station may include a transmitter 2601, a receiver 2602, a memory 2603, and a processor 2604 that is separately connected to the transmitter 2601, the receiver 2602, and the memory 2603. Certainly, the base station may further include general components, such as an antenna, a baseband processing component, an intermediate/radio frequency processing component, and an input/output apparatus. This embodiment of the present invention sets no limitation thereto.

The memory 2603 stores a group of program code, and the processor 2604 is configured to invoke the program code stored in the memory 2603, so as to execute the following operations:

obtaining an operator list and an operator barring indication, where the operator barring indication is used to indicate an identifier of a PLMN that is barred for access; and broadcasting the operator list and the operator barring indication, so that after a UE reads the operator list and the operator barring indication, and when the operator list does not include a PLMN with which the UE successfully registers most recently, an HPLMN of the UE, a UPLMN of the UE, or an OPLMN of the UE, the UE selects, when the operator list includes at least two VPLMNs, one PLMN except the PLMN indicated by the operator barring indication from the at least two VPLMNs for access.

It should be noted that the UE shown in FIG. 26 may be configured to implement the method provided in the embodiment shown in FIG. 9 of the present invention.

In the foregoing embodiment, when a core network node of an operator is overloaded or a quantity of access subscribers of an operator reaches an upper limit of a rented share, subsequent access of a roaming subscriber can be forbidden, to prevent overload of an operator.

Figure 27:
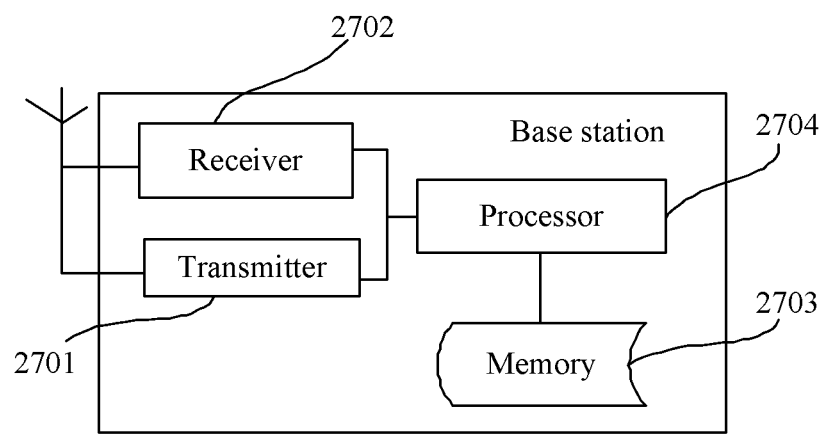
FIG. 27 is a schematic structural diagram of still another embodiment of a base station according to the present invention.

FIG. 27 is a schematic structural diagram of still another embodiment of a base station according to the present invention. As shown in FIG. 27, the base station may include a transmitter 2701, a receiver 2702, a memory 2703, and a processor 2704 that is separately connected to the transmitter 2701, the receiver 2702, and the memory 2703. Certainly, the base station may further include general components, such as an antenna, a baseband processing component, an intermediate/radio frequency processing component, and an input/output apparatus. This embodiment of the present invention sets no limitation thereto.

The memory 2703 stores a group of program code, and the processor 2704 is configured to invoke the program code stored in the memory 2703, so as to execute the following operations:

obtaining an operator list and a preferred operator indication, where the preferred operator indication is used to indicate an identifier of a PLMN that is preferably accessed by a roaming subscriber; and broadcasting the operator list and the preferred operator indication, so that after a UE reads the operator list and the preferred operator indication that are broadcast by a cell, and when the operator list does not include a PLMN with which the UE successfully registers most recently, an HPLMN of the UE, a UPLMN of the UE, or an OPLMN of the UE, the UE selects the PLMN indicated by the preferred operator indication from the operator list for access.

It should be noted that the UE shown in FIG. 27 may be configured to implement the method provided in the embodiment shown in FIG. 10 of the present invention.

In the foregoing embodiment, a roaming subscriber can access an operator indicated by a preferred operator indication.

Persons skilled in the art may understand that the accompanying drawings are merely schematic diagrams of exemplary embodiments, and modules or processes in the accompanying drawings are not necessarily required for implementing the present invention.

Persons skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into a plurality of submodules.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An access control method, comprising:
    receiving, by a base station from user equipment, a temporary identifier and a public land mobile network (PLMN) available indication that are of the user equipment;
    receiving, by the base station from the user equipment, a service request message;
    identifying, by the base station, a serving mobility management entity of the user equipment according to a global mobility management entity identifier in the temporary identifier;

sending, by the base station, the service request message and the PLMN available indication to the serving mobility management entity;

receiving, by the base station, a redirection message from the serving mobility management entity, the redirection message carrying the service request message, a cause of redirection, and information about a target mobility management entity of redirection;

sending, by the base station, an initial user equipment message to the target mobility management entity of redirection according to the information about the target mobility management entity of redirection, the initial user equipment message carrying the service request message and a redirection attempt flag; and receiving, by the base station, a redirection complete indication from the target mobility management entity of redirection.

2. The method according to claim 1, wherein the information about the target mobility management entity of redirection comprises at least one of an identifier of the target mobility management entity of redirection and an address of the target mobility management entity of redirection.

3. An access control method, comprising:

receiving, by a base station from user equipment, a temporary identifier and a public land mobile network (PLMN) available indication that are of the user equipment;

receiving, by the base station from the user equipment, a service request message;

identifying, by the base station, a serving mobility management entity of the user equipment according to a global mobility management entity identifier in the temporary identifier; and sending, by the base station, the service request message and the PLMN available indication to the serving mobility management entity;

receiving, by the base station, a redirection message from the serving mobility management entity, the redirection message carrying the service request message, a cause of redirection, and an identifier of a target PLMN of redirection;

identifying, by the base station according to the identifier of the target PLMN of redirection, a target mobility management entity of redirection to which the target PLMN of redirection belongs;

sending an initial user equipment message to the target mobility management entity of redirection, the initial user equipment message carrying the service request message and a redirection attempt flag; and receiving, by the base station, a redirection complete indication from the target mobility management entity of redirection.

4. The method according to claim 1, wherein after the receiving, by the base station, a redirection complete indication, the method further comprises:

receiving, by the base station, an initial context setup message from the target mobility management entity of redirection, wherein the initial context setup message is sent to the base station after a bearer between a serving gateway and a packet data gateway is set up, and a location of the user equipment in a home subscriber server is updated by the target mobility management entity of redirection; and sending, by the base station after a radio bearer between the base station and the user equipment is set up, an initial user equipment context setup complete message to the target mobility management entity of redirection.

5. The method according to claim 1, wherein the PLMN available indication is used to indicate that a home PLMN of the user equipment is available, or the PLMN available indication is used to indicate that an equivalent home PLMN of the user equipment is available.

6. The method according to claim 5, wherein the PLMN available indication is used to indicate that the equivalent home PLMN of the user equipment is available, before the receiving, by the base station, a service request message sent by the user equipment, the method further comprises:

receiving, by the base station, an identifier, from the user equipment, of the equivalent home PLMN selected by the user equipment; and after the determining a serving mobility management entity of the user equipment, the method further comprises:

sending, by the base station, the identifier of the equivalent home PLMN to the serving mobility management entity.

7. The method according to claim 1, wherein:

the cause of redirection comprises one of following:

the user equipment is redirected to a home PLMN of the user equipment, the user equipment is redirected to an equivalent home PLMN of the user equipment, a registered PLMN of the user equipment changes, a home PLMN of the user equipment is available, and an equivalent home PLMN of the user equipment is available.

8. A base station, comprising:

a receiver, a processor, wherein the processor is coupled with the receiver, and a transmitter, wherein the transmitter is coupled with the processor, wherein:

the receiver receives, from user equipment, a temporary identifier and a public land mobile network (PLMN) available indication that are of the user equipment, and receives a service request message from the user equipment;

the processor identifies a serving mobility management entity of the user equipment according to a global mobility management entity identifier in the temporary identifier, the processor causes the transmitter to send the service request message and the PLMN available indication to the serving mobility management entity, the receiver further receives a redirection message from the serving mobility management entity, the redirection message carrying the service request message, a cause of redirection, and information about a target mobility management entity of redirection, and further receives a redirection complete indication from the target mobility management entity of redirection, and the processor further causes the transmitter to send the initial user equipment message to the target mobility management entity of redirection according to the information about the target mobility management entity of redirection, the initial user equipment message carrying the service request message and a redirection attempt flag.

9. The base station according to claim 8, wherein:
the receiver further receives a redirection message from the serving mobility management entity, wherein the redirection message carries the service request message, a cause of redirection, and an identifier of a target PLMN of redirection; and receives a redirection complete indication from a target mobility management entity of redirection;
the processor further identifies, according to the identifier of the target PLMN of redirection, a target mobility management entity of redirection to which the target PLMN of redirection belongs; and
the processor further causes the transmitter to send the initial user equipment message to the target mobility management entity of redirection, wherein the initial user equipment message carries the service request message and a redirection attempt flag.

10. The base station according to claim 8, wherein:
the receiver further receives, after receiving the redirection complete indication, an initial context setup message from the target mobility management entity of redirection, wherein the initial context setup message is received by the base station after a bearer between a serving gateway and a packet data gateway is set up, and a location of the user equipment in a home subscriber server is updated by the target mobility management entity of redirection;
the processor further sets up a radio bearer between the base station and the user equipment; and
the processor further causes the transmitter to send an initial user equipment context setup complete message to the target mobility management entity of redirection after the radio bearer between the base station and the user equipment is set up.

11. The base station according to claim 8, wherein the PLMN available indication is used to indicate that a home PLMN of the user equipment is available, or the PLMN available indication is used to indicate that an equivalent home PLMN of the user equipment is available.

12. The base station according to claim 11, wherein:
the PLMN available indication is used to indicate that the equivalent home PLMN of the user equipment is available,
the receiver receives, before receiving the service request message from the user equipment, an identifier, from the user equipment, of the equivalent home PLMN selected by the user equipment; and
the processor further causes the transmitter to send the identifier of the equivalent home PLMN selected by the user equipment to the serving mobility management entity.

13. A system, comprising a base station and a mobility management entity, wherein
the base station is configured to:
receive, from user equipment, a temporary identifier and a public land mobile network (PLMN) available indication that are of the user equipment, and receives a service request message from the user equipment,
identify a serving mobility management entity of the user equipment according to a global mobility management entity identifier in the temporary identifier, and
send the service request message and the PLMN available indication to the serving mobility management entity;

the mobility management entity is the serving mobility management entity and is configured to:
receive, from the base station, a service request message and a public land mobile network PLMN available indication, and
send a redirection indication, so that the user equipment registers with a target PLMN of redirection,
wherein:
the base station is further configured to:
receive a redirection message from the serving mobility management entity, the redirection message carrying the service request message, a cause of redirection, and information about a target mobility management entity of redirection,
send the initial user equipment message to the target mobility management entity of redirection according to the information about the target mobility management entity of redirection, the initial user equipment message carrying the service request message and a redirection attempt flag, and
receive a redirection complete indication from the target mobility management entity of redirection; and
the mobility management entity is further configured to send the redirection message to the base station after receiving the PLMN available indication.

14. The system according to claim 13, wherein:
the base station is further configured to
receive a redirection message from the serving mobility management entity, wherein the redirection message carries the service request message, a cause of redirection, and an identifier of a target PLMN of redirection;
identify, according to the identifier of the target PLMN of redirection, a target mobility management entity of redirection to which the target PLMN of redirection belongs;
send the initial user equipment message to the target mobility management entity of redirection, wherein the initial user equipment message carries the service request message and a redirection attempt flag; and
receive a redirection complete indication from a target mobility management entity of redirection.

15. The system according to claim 13, wherein:
the base station is further configured to
receive, after receiving the redirection complete indication, an initial context setup message from the target mobility management entity of redirection, wherein the initial context setup message is received by the base station after a bearer between a serving gateway and a packet data gateway is set up, and a location of the user equipment in a home subscriber server is updated by the target mobility management entity of redirection;
set up a radio bearer between the base station and the user equipment; and
send an initial user equipment context setup complete message to the target mobility management entity of redirection after the radio bearer between the base station and the user equipment is set up.

16. The system according to claim 13, wherein the PLMN available indication indicates that a home PLMN of the user equipment is available, or the PLMN available indication indicates that an equivalent home PLMN of the user equipment is available.

17. The system according to claim 16, wherein:
the PLMN available indication indicates that the equivalent home PLMN of the user equipment is available,
the base station is further configured to
  receive, before receiving the service request message from the user equipment, an identifier, from the user equipment, of the equivalent home PLMN selected by the user equipment; and
  send the identifier of the equivalent home PLMN selected by the user equipment to the serving mobility management entity.

* * * * *